(12) United States Patent
Adams et al.

(10) Patent No.: US 8,070,841 B2
(45) Date of Patent: *Dec. 6, 2011

(54) SYSTEMS AND METHODS FOR SUPPLYING AUXILIARY FUEL STREAMS DURING INTERMITTENT BYPRODUCT DISCHARGE FROM PRESSURE SWING ADSORPTION ASSEMBLIES

(75) Inventors: Patton M. Adams, Bend, OR (US);
Travis A. Bizjak, Bend, OR (US);
James A. Givens, Bend, OR (US)

(73) Assignee: Idatech, LLC, Bend, OR (US)

( * ) Notice: Subject to any disclaimer, the term of this patent is extended or adjusted under 35 U.S.C. 154(b) by 1004 days.

This patent is subject to a terminal disclaimer.

(21) Appl. No.: 12/001,838

(22) Filed: Dec. 12, 2007

(65) Prior Publication Data
US 2009/0151249 A1    Jun. 18, 2009

(51) Int. Cl.
*B01J 7/00* (2006.01)
(52) U.S. Cl. .................. 48/197 FM; 48/197 R; 48/127.1
(58) Field of Classification Search ..... 48/197 R–197 A, 48/127.1
See application file for complete search history.

(56) References Cited

U.S. PATENT DOCUMENTS

| | | | |
|---|---|---|---|
| 2,751,034 A | 6/1956 | Ringo et al. |
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,487,608 A | 1/1970 | Gräff |
| 3,522,019 A | 7/1970 | Buswell et al. |
| 3,564,816 A | 2/1971 | Batta |
| 3,655,448 A | 4/1972 | Setzer |
| 3,986,849 A | 10/1976 | Fuderer et al. |
| 4,038,054 A | 7/1977 | Gräff |
| 4,098,959 A | 7/1978 | Fanciullo |

(Continued)

FOREIGN PATENT DOCUMENTS
CA    2516989    9/2004
(Continued)

OTHER PUBLICATIONS

English-language abstract of Japanese Patent Application Publication No. JP 2001-10806.

(Continued)

*Primary Examiner* — Alexa Neckel
*Assistant Examiner* — Imran Akram
(74) *Attorney, Agent, or Firm* — Dascenzo Intellectual Property Law, P.C.

(57) ABSTRACT

Combustion fuel stream supply systems for use with pressure swing adsorption (PSA) assemblies, and hydrogen-generation assemblies and/or fuel cell systems containing the same. The PSA assemblies are operated according to a PSA cycle to receive a mixed gas stream and, while producing a product hydrogen stream therefrom, intermittently discharge a byproduct stream. The byproduct stream, when available, may be delivered as a fuel stream to a heating assembly, which may heat the hydrogen-producing region that produces the mixed gas stream. A combustion fuel stream supply system selectively supplies an auxiliary fuel stream when a byproduct stream is not discharged or otherwise does not have a predetermined combustion fuel value sufficient, when combusted, to maintain the hydrogen-producing region within a desired temperature range. The one or more streams supplied to the heating assembly have a combined combustion fuel value at least as great as the predetermined threshold value.

24 Claims, 4 Drawing Sheets

U.S. PATENT DOCUMENTS

| | | | |
|---|---|---|---|
| 4,098,960 A | 7/1978 | Gagnon | |
| 4,175,165 A | 11/1979 | Adlhart | |
| 4,214,969 A | 7/1980 | Lawrance | |
| 4,272,265 A | 6/1981 | Snyder | |
| 4,402,712 A | 9/1983 | Benkmann | |
| 4,406,675 A | 9/1983 | Dangieri et al. | |
| 4,452,612 A | 6/1984 | Mattia | |
| 4,468,235 A | 8/1984 | Hill | |
| 4,469,494 A | 9/1984 | van Weenen | |
| 4,693,730 A | 9/1987 | Miller et al. | |
| 4,758,253 A | 7/1988 | Davidson et al. | |
| 4,787,417 A | 11/1988 | Windsor, Jr. | |
| 4,925,464 A | 5/1990 | Rabenau et al. | |
| 4,941,894 A | 7/1990 | Black | |
| 4,968,334 A | 11/1990 | Hilton | |
| 5,112,367 A | 5/1992 | Hill | |
| 5,114,441 A | 5/1992 | Kanner et al. | |
| 5,133,784 A | 7/1992 | Boudet et al. | |
| 5,176,722 A | 1/1993 | Lemcoff et al. | |
| 5,256,172 A | 10/1993 | Keefer | |
| 5,256,174 A | 10/1993 | Kai et al. | |
| 5,268,021 A | 12/1993 | Hill et al. | |
| 5,296,017 A | 3/1994 | Kono et al. | |
| 5,366,541 A | 11/1994 | Hill et al. | |
| 5,401,589 A | 3/1995 | Palmer et al. | |
| 5,432,710 A | 7/1995 | Ishimaru et al. | |
| 5,441,559 A | 8/1995 | Petit et al. | |
| RE35,099 E | 11/1995 | Hill | |
| 5,487,775 A | 1/1996 | LaCava et al. | |
| 5,593,478 A | 1/1997 | Hill et al. | |
| 5,637,414 A | 6/1997 | Inoue et al. | |
| 5,730,778 A | 3/1998 | Hill et al. | |
| 5,807,423 A | 9/1998 | Lemcoff et al. | |
| 5,814,130 A | 9/1998 | Lemcoff et al. | |
| 5,814,131 A | 9/1998 | Lemcoff et al. | |
| 5,820,656 A | 10/1998 | Lemcoff et al. | |
| 5,861,137 A | 1/1999 | Edlund | |
| 5,891,217 A | 4/1999 | Lemcoff et al. | |
| 5,961,928 A | 10/1999 | Maston et al. | |
| 5,979,440 A | 11/1999 | Honkonen et al. | |
| 5,997,594 A | 12/1999 | Edlund et al. | |
| 6,045,933 A | 4/2000 | Okamoto | |
| 6,051,050 A | 4/2000 | Keefer et al. | |
| 6,056,804 A | 5/2000 | Keefer et al. | |
| 6,063,161 A | 5/2000 | Keefer et al. | |
| 6,068,680 A | 5/2000 | Kulish et al. | |
| 6,083,637 A | 7/2000 | Walz et al. | |
| 6,143,056 A | 11/2000 | Smolarek et al. | |
| 6,168,422 B1 | 1/2001 | Motyka et al. | |
| 6,176,897 B1 | 1/2001 | Keefer | |
| 6,221,117 B1 | 4/2001 | Edlund et al. | |
| 6,311,719 B1 | 11/2001 | Hill et al. | |
| 6,379,645 B1 | 4/2002 | Bucci et al. | |
| 6,406,523 B1 | 6/2002 | Connor et al. | |
| 6,451,095 B1 | 9/2002 | Keefer et al. | |
| 6,457,485 B2 | 10/2002 | Hill et al. | |
| 6,471,744 B1 | 10/2002 | Hill | |
| 6,483,001 B2 | 11/2002 | Golden et al. | |
| 6,497,856 B1 | 12/2002 | Lomax, Jr. et al. | |
| 6,514,318 B2 | 2/2003 | Keefer | |
| 6,514,319 B2 | 2/2003 | Keefer et al. | |
| 6,565,627 B1 | 5/2003 | Golden et al. | |
| 6,576,043 B2 | 6/2003 | Zwilling et al. | |
| 6,623,719 B2 | 9/2003 | Lomax, Jr. et al. | |
| 6,627,338 B2 | 9/2003 | St-Pierre et al. | |
| 6,635,372 B2 | 10/2003 | Gittleman | |
| 6,651,653 B1 | 11/2003 | Honkonen et al. | |
| 6,658,894 B2 | 12/2003 | Golden et al. | |
| 6,660,064 B2 | 12/2003 | Golden et al. | |
| 6,681,764 B1 | 1/2004 | Honkonen et al. | |
| 6,691,702 B2 | 2/2004 | Appel et al. | |
| 6,692,545 B2 | 2/2004 | Gittleman et al. | |
| 6,698,423 B1 | 3/2004 | Honkonen et al. | |
| 6,699,307 B1 | 3/2004 | Lomax, Jr. | |
| 6,712,087 B2 | 3/2004 | Hill et al. | |
| RE38,493 E | 4/2004 | Keefer et al. | |
| 6,740,258 B1 | 5/2004 | Wyschofsky et al. | |
| 6,755,895 B2 | 6/2004 | Lomax, Jr et al. | |
| 6,770,390 B2 | 8/2004 | Golden et al. | |
| 6,794,070 B2 | 9/2004 | Amrhein et al. | |
| 6,814,787 B2 | 11/2004 | Golden et al. | |
| 6,846,585 B2 | 1/2005 | Robb et al. | |
| 7,011,693 B2 | 3/2006 | Mallavarapu et al. | |
| 2001/0045061 A1 | 11/2001 | Edlund et al. | |
| 2002/0004157 A1 | 1/2002 | Keefer et al. | |
| 2002/0085970 A1 | 7/2002 | Sederquist et al. | |
| 2002/0114747 A1 | 8/2002 | Marchand et al. | |
| 2002/0127442 A1 | 9/2002 | Connor et al. | |
| 2002/0168306 A1 | 11/2002 | Gittleman | |
| 2003/0008186 A1 | 1/2003 | Dickman et al. | |
| 2003/0070550 A1 | 4/2003 | Keefer et al. | |
| 2003/0143448 A1 | 7/2003 | Keefer | |
| 2003/0157390 A1 | 8/2003 | Keefer et al. | |
| 2003/0192251 A1 | 10/2003 | Edlund et al. | |
| 2003/0196550 A1 | 10/2003 | Keefer et al. | |
| 2003/0205131 A1 | 11/2003 | Golden et al. | |
| 2003/0223926 A1 | 12/2003 | Edlund et al. | |
| 2004/0005492 A1 | 1/2004 | Keefer et al. | |
| 2004/0011198 A1 | 1/2004 | Keefer et al. | |
| 2004/0074388 A1 | 4/2004 | Lomax, Jr. | |
| 2004/0131911 A1 | 7/2004 | Kaufmann et al. | |
| 2004/0131912 A1 | 7/2004 | Keefer et al. | |
| 2004/0163534 A1 | 8/2004 | Lomax, Jr. | |
| 2004/0197616 A1 | 10/2004 | Edlund et al. | |
| 2004/0250472 A1 | 12/2004 | Okada et al. | |
| 2005/0183336 A1 | 8/2005 | Sumi et al. | |
| 2005/0229488 A1 | 10/2005 | Stevens | |
| 2006/0088468 A1* | 4/2006 | Sumi et al. | 423/648.1 |
| 2006/0130651 A1 | 6/2006 | Bizjak | |
| 2006/0183009 A1 | 8/2006 | Berlowitz et al. | |
| 2007/0033949 A1 | 2/2007 | Raybold et al. | |
| 2010/0015039 A1* | 1/2010 | Doshi et al. | 423/652 |
| 2011/0023708 A1* | 2/2011 | Bizjak | 95/12 |
| 2011/0053006 A1* | 3/2011 | Adams et al. | 429/411 |

FOREIGN PATENT DOCUMENTS

| | | |
|---|---|---|
| JP | 11-001301 | 1/1999 |
| JP | 2000-281308 | 10/2000 |
| JP | 2001-10806 | 1/2001 |

OTHER PUBLICATIONS

International Search Report and Written Opinion for PCT Patent Application Serial No. PCT/US08/85272, dated Feb. 9, 2009.

* cited by examiner

SYSTEMS AND METHODS FOR SUPPLYING AUXILIARY FUEL STREAMS DURING INTERMITTENT BYPRODUCT DISCHARGE FROM PRESSURE SWING ADSORPTION ASSEMBLIES

FIELD OF THE DISCLOSURE

The present disclosure is directed generally to hydrogen-generation assemblies that include pressure swing adsorption assemblies, and more particularly to systems and methods for providing a heating assembly with a continuous flow of combustible fuel, having a fuel value at least as great as a predetermined threshold fuel value, that is sufficient, when combusted, to maintain a selected component of the hydrogen-generation assembly at or within a desired temperature range.

BACKGROUND OF THE DISCLOSURE

A hydrogen-generation assembly is an assembly that includes a fuel processing system that is adapted to convert one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen is the fuel, the oxygen is the oxidant, and the water is the reaction product. Fuel cells typically require high purity hydrogen gas to prevent the fuel cells from being damaged during use. The product stream from the fuel processing system of a hydrogen-generation assembly may contain impurities, illustrative examples of which include one or more of carbon monoxide, carbon dioxide, methane, unreacted feedstock, and water. Therefore, there is a need in many conventional fuel cell systems to include suitable structure for removing impurities from the impure hydrogen stream produced in the fuel processing system and/or from the hydrogen-containing fuel stream for a fuel cell stack.

A pressure swing adsorption (PSA) process is an example of a mechanism that may be used to remove impurities from an impure hydrogen gas stream by selective adsorption of one or more of the impurities present in the impure hydrogen stream. The adsorbed impurities can be subsequently desorbed and removed from the PSA assembly. PSA is a pressure-driven separation process that typically utilizes a plurality of adsorbent beds. The beds are cycled through a series of steps, such as pressurization, separation (adsorption), depressurization (desorption), and purge steps to selectively remove impurities from the hydrogen gas and then desorb the impurities.

Many hydrogen-generation assemblies include a heating assembly that combusts at least one fuel stream with air to produce a heated exhaust stream for heating at least a portion of the hydrogen-generation assembly. The fuel streams may come from a variety of sources, including the PSA assembly. However, PSA assemblies are operated in PSA cycles that may result in the production of exhaust, or byproduct, streams having varying and intermittent flows and/or varying fuel values, or only intermittently discharge byproduct streams. When used as a fuel stream for a heating assembly, this intermittency, variation, and/or interruption in flow rate and/or fuel value may produce inconsistent, often unpredictable, results in the heating assembly, such as during periods of no fuel, periods of insufficient fuel, periods in which the fuel streams have variable fuel values, etc. As a result, it may be difficult for the heating assembly to maintain a selected component of the hydrogen-generation assembly at a desired temperature or within a desired, or selected, temperature range. Similarly, at times, the PSA assembly may not be producing sufficient, or any, exhaust stream to maintain a flame or other ignition source of a heating assembly in operation.

SUMMARY OF THE DISCLOSURE

The present disclosure is directed to combustion fuel stream supply systems for use with PSA assemblies, as well as to hydrogen-generation assemblies and/or fuel cell systems containing the same, and to methods of operating the same. The PSA assemblies include at least one adsorbent bed, and typically a plurality of adsorbent beds, that include an adsorbent region including adsorbent adapted to remove impurities from a mixed gas stream containing hydrogen gas as a majority component and other gases. The mixed gas stream may be produced by a hydrogen-producing region of a fuel processing system, and the PSA assembly may produce a product hydrogen stream that is consumed by a fuel cell stack to provide a fuel cell system that produces electrical power. The PSA assembly produces and intermittently discharges a byproduct stream containing impurities removed from the mixed gas stream and a purge gas, which may be or include hydrogen gas, and a heating assembly may be adapted to receive the discharged byproduct stream as a fuel stream for generating a heated exhaust stream. The heated exhaust stream may be adapted to heat at least the hydrogen-producing region of a fuel processing system, such as to maintain the region at a suitable temperature or within a suitable temperature range for producing the mixed gas stream.

The PSA assembly is adapted to cycle through at least one reduced byproduct period, such as an equalization step of a PSA cycle, during which a byproduct stream is not discharged or otherwise does not have a combustible fuel value sufficient, when combusted, to maintain the hydrogen-producing region within a desired temperature range. A combustion fuel stream supply system is adapted to selectively supply, during at least a reduced byproduct period, an auxiliary fuel stream to the heating assembly, such that the one or more streams supplied to the heating assembly have a combined combustion fuel value at least as great as the corresponding, predetermined threshold value.

In some embodiments, the combustion fuel stream supply system includes a reservoir assembly adapted to receive and store one or more fuel streams for reuse as an auxiliary fuel stream, or as a component thereof. For example, the combustion fuel stream supply system may be adapted to selectively direct at least a portion of the byproduct stream discharged from the PSA assembly, having at least a predetermined threshold fuel value, to the reservoir assembly, and to selectively use at least a portion of the stored byproduct stream when supplying the auxiliary fuel stream. In this and other examples, the auxiliary fuel stream may consist solely of the stored byproduct stream, or the stored byproduct stream may be combined with other fuel streams to form the auxiliary fuel stream.

In some embodiments, the combustion fuel stream supply system is adapted to selectively redirect at least a portion of the mixed gas stream prior to its delivery to the PSA assembly, and to use at least a portion of the redirected mixed gas stream as a "slip" stream when supplying the auxiliary fuel stream. In this and other examples, the auxiliary fuel stream may consist solely of the redirected mixed gas stream, or the redirected mixed gas stream may be combined with one or more other fuel streams to form the auxiliary fuel stream.

Some embodiments may combine the above examples to provide an auxiliary fuel stream that consists of more than one fuel stream. For example, an auxiliary fuel stream may include one or more stored gas streams (such as a stored byproduct stream) in combination with one or more slip streams (such as a redirected mixed gas stream). In the aforementioned embodiments, the combustion fuel supply system includes suitable mechanism(s) and structure for selectively supplying one or more streams to the heating assembly to ensure a continuous supply of combustible fuel having at least a predetermined threshold fuel value over a desired operational period. For example, some embodiments include devices to regulate flow of the various gas streams and sensors to monitor the fuel of various gas streams. Some embodiments further include a controller adapted to determine which fuel stream(s) to supply as an auxiliary fuel stream, based at least in part on the monitored fuel values of the various fuel streams and/or the byproduct stream when discharged from the PSA assembly.

DETAILED DESCRIPTION AND BEST MODE OF THE DISCLOSURE

Figure 1:
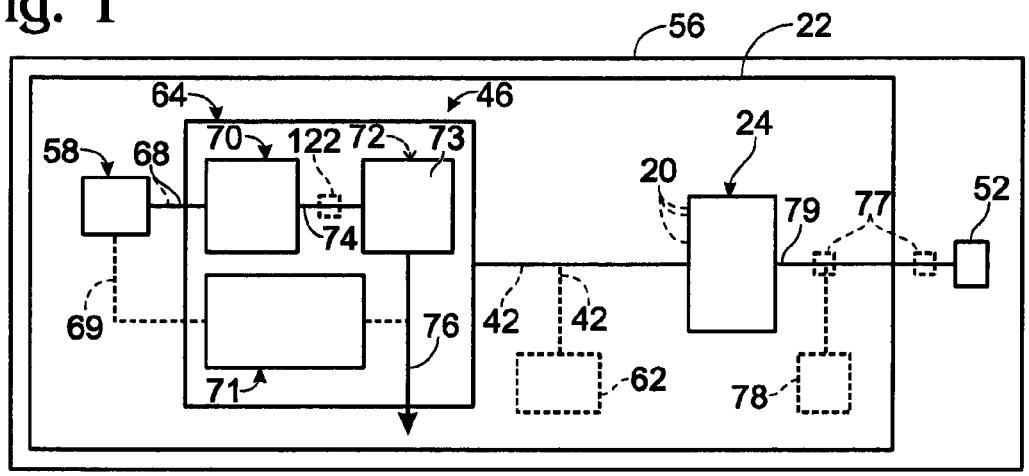
FIG. 1 is a schematic view of an illustrative example of an energy producing and consuming assembly that includes a hydrogen-generation assembly with an associated feedstock delivery system and a fuel processing system, as well as a fuel cell stack, and an optional energy-consuming device.

FIG. 1 illustrates schematically an example of an energy producing and consuming assembly 56. The energy producing and consuming assembly 56 includes an energy-producing system 22 and at least one energy-consuming device 52 adapted to exert an applied load on the energy-producing system 22. In the illustrated example, the energy-producing system 22 includes a fuel cell stack 24 and a hydrogen-generation assembly 46. More than one of any of the illustrated components may be used without departing from the scope of the present disclosure. The energy-producing system may include additional components that are not specifically illustrated in the schematic figures, such as air delivery systems, heat exchangers, sensors, controllers, flow-regulating devices, fuel and/or feedstock delivery assemblies, heating assemblies, cooling assemblies, and the like. System 22 may also be referred to as a fuel cell system.

As discussed in more detail herein, hydrogen-generation assemblies and/or fuel cell systems according to the present disclosure include a separation assembly that includes at least one pressure swing adsorption (PSA) assembly that is adapted to increase the purity of the hydrogen gas that is produced in the hydrogen-generation assembly and/or consumed in the fuel cell stack. In a PSA process, gaseous impurities are removed from a stream containing hydrogen gas. PSA is based on the principle that certain gases, under the proper conditions of temperature and pressure, will be adsorbed onto an adsorbent material more strongly than other gases. These impurities may thereafter be desorbed and removed, such as in the form of a byproduct stream. The success of using PSA for hydrogen purification is due to the relatively strong adsorption of common impurity gases (such as, but not limited to, CO, $CO_2$, hydrocarbons including $CH_4$, and $N_2$) on the adsorbent material. Hydrogen gas adsorbs only very weakly and so hydrogen passes through the adsorbent bed while the impurities are retained on the adsorbent material.

As discussed in more detail herein, a PSA process typically involves repeated, or cyclical, application of at least pressurization, separation (adsorption), depressurization (desorption), and purge steps, or processes, to selectively remove impurities from the hydrogen gas and then desorb the impurities. Accordingly, the PSA process may be described as being adapted to repeatedly enable a PSA cycle of steps, or stages, such as the above-described steps. The degree of separation is affected by the pressure difference between the pressure of the mixed gas stream and the pressure of the byproduct stream. Accordingly, the desorption step will typically include reducing the pressure within the portion of the PSA assembly containing the adsorbed gases, and optionally may even include drawing a vacuum (i.e., reducing the pressure to less than atmospheric or ambient pressure) on that portion of the assembly. Similarly, increasing the feed pressure of the mixed gas stream to the adsorbent regions of the PSA assembly may beneficially affect the degree of separation during the adsorption step. Using multiple adsorbent regions, such as two or more adsorbent beds that are pressurized and depressurized in a reciprocal relationship, may permit pressure equalization between adsorbent beds, such as during one or more equalization steps in which the beds are fluidly connected to partially pressurize one bed by reducing the pressure in the other.

As illustrated schematically in FIG. 1, the hydrogen-generation assembly 46 includes at least a fuel processing system 64 and a feedstock delivery system 58, as well as the associated fluid conduits interconnecting various components of the system. As used herein, the term "hydrogen-generation assembly" may be used to refer to the fuel processing system 64 and associated components of the energy-producing system, such as feedstock delivery systems 58, heating assemblies, separation regions or devices, air delivery systems, fuel delivery systems, fluid conduits, heat exchangers, cooling assemblies, sensor assemblies, flow regulators, controllers, etc. All of these illustrative components are not required to be included in any hydrogen-generation assembly or used with any fuel processing system according to the present disclosure. Similarly, other components may be included or used as part of the hydrogen-generation assembly.

Regardless of its construction or components, the feedstock delivery system 58 is adapted to deliver to the fuel processing system 64 one or more feedstocks via one or more streams, which may be referred to generally as feedstock supply stream(s) 68. In the following discussion, reference may be made only to a single feedstock supply stream, but is within the scope of the present disclosure that two or more such streams, of the same or different composition, may be used. In some embodiments, air may be supplied to the fuel processing system 64 via a blower, fan, compressor or other suitable air delivery system, and/or a water stream may be delivered from a separate water source.

Fuel processing system 64 includes any suitable device(s) and/or structure(s) that are configured to produce hydrogen gas as a majority reaction product from the feedstock supply stream(s) 68. As schematically illustrated in FIG. 1, the fuel processing system 64 includes a hydrogen-producing region 70. Accordingly, fuel processing system 64 may be described as including a hydrogen-producing region 70 that produces a hydrogen-rich stream 74 that includes hydrogen gas as a majority component from the feedstock supply stream. While stream 74 contains hydrogen gas as its majority component, it also contains other gases, and as such may be referred to as a mixed gas stream, which contains hydrogen gas and other gases. Illustrative, non-exclusive examples of these other gases, or impurities, include one or more of such illustrative impurities as carbon monoxide, carbon dioxide, water, methane, and unreacted feedstock.

Illustrative examples of suitable mechanisms for producing hydrogen gas from feedstock supply stream 68 include steam reforming and autothermal reforming, in which reforming catalysts are used to produce hydrogen gas from a feedstock supply stream 68 containing water and at least one carbon-containing feedstock. Other examples of suitable mechanisms for producing hydrogen gas include pyrolysis and catalytic partial oxidation of a carbon-containing feedstock, in which case the feedstock supply stream 68 does not contain water. Still another suitable mechanism for producing hydrogen gas is electrolysis, in which case the feedstock is water. Illustrative examples of suitable carbon-containing feedstocks include at least one hydrocarbon or alcohol. Illustrative examples of suitable hydrocarbons include methane, propane, natural gas, diesel, kerosene, gasoline and the like. Illustrative examples of suitable alcohols include methanol, ethanol, and polyols, such as ethylene glycol and propylene glycol.

The hydrogen-generation assembly 46 may utilize more than a single hydrogen-producing mechanism in the hydrogen-producing region 70 and may include more than one hydrogen-producing region. Each of these mechanisms is driven by, and results in, different thermodynamic balances in the hydrogen-generation assembly 46. Accordingly, the hydrogen-generation assembly 46 may further include a temperature modulating assembly 71, such as a heating assembly and/or a cooling assembly. The temperature modulating assembly 71 may be configured as part of the fuel processing system 64 or may be an external component that is in thermal and/or fluid communication with the hydrogen-producing region 70. The temperature modulating assembly 71 may consume a fuel stream, such as to generate heat. While not required in all embodiments of the present disclosure, the fuel stream may be delivered from the feedstock delivery system. For example, and as indicated in dashed lines in FIG. 1, this fuel, or feedstock, may be received from feedstock delivery system 58 via a fuel supply stream 69. The fuel stream 69 may include combustible fuel, fluids to facilitate cooling, and/or any fluid appropriate for the temperature modulating assembly 71. In some embodiments, the temperature modulating assembly may receive some or all of its feedstock from other sources or supply streams, such as from additional storage tanks, a combustion fuel stream supply system, and so forth. It may also receive an air stream from any suitable source, including the environment within which the assembly is used. Blowers, fans and/or compressors may be used to provide the air stream, but this is not required to all embodiments.

The temperature modulating assembly 71 may include one or more heat exchangers, burners, combustion systems, and other such devices for supplying heat to regions of the fuel processing system and/or other portions of assembly 56. Depending on the configuration of the hydrogen-generation assembly 46, the temperature modulating assembly 71 may also, or alternatively, include heat exchangers, fans, blowers, cooling systems, and other such devices for cooling regions of the fuel processing system 64 or other portions of assembly 56. For example, when the fuel processing system 64 is configured with a hydrogen-producing region 70 based on steam reforming or another endothermic reaction, the temperature modulating assembly 71 may include systems for supplying heat to maintain the temperature of the hydrogen-producing region 70 and the other components in the proper range.

When the fuel processing system is configured with a hydrogen-producing region 70 based on catalytic partial oxidation or another exothermic reaction, the temperature modulating assembly 71 may include systems for removing heat, i.e., supplying cooling, to maintain the temperature of the fuel processing system in the proper range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature moderating assemblies that are configured to cool, or reduce the temperature of, all or selected regions of the fuel processing system.

Figure 2:
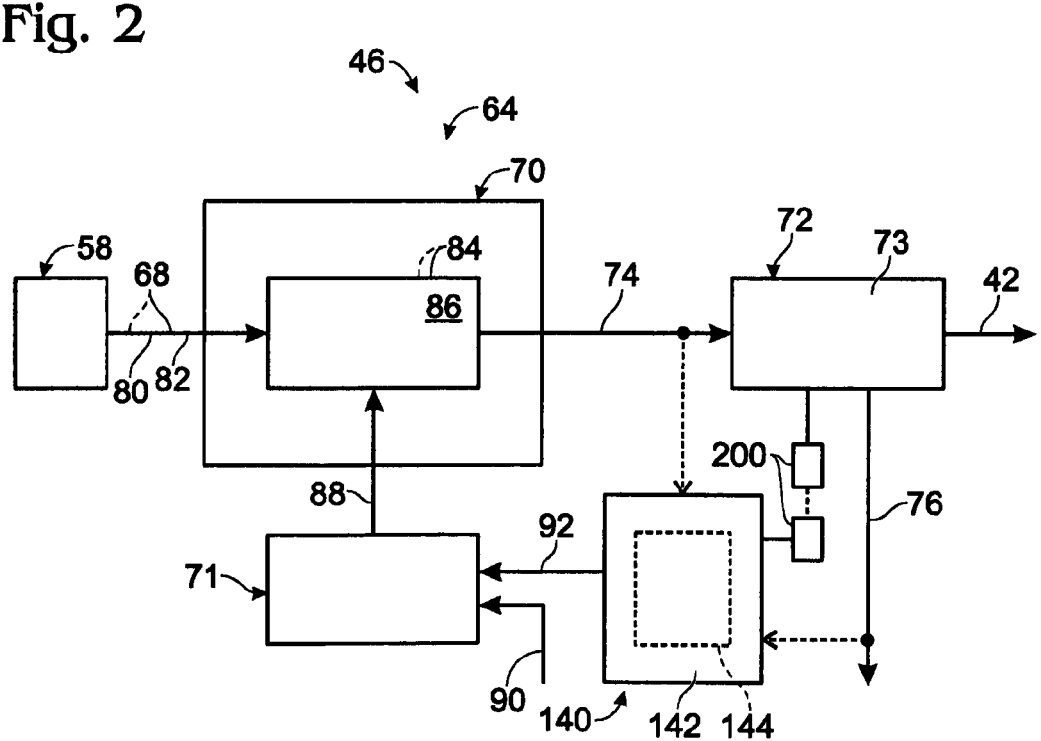
FIG. 2 is a schematic view of a hydrogen-producing assembly in the form of a steam reformer adapted to produce a reformate stream containing hydrogen gas and other gases from water and at least one carbon-containing feedstock.

In FIG. 2, an illustrative example of a hydrogen-generation assembly 46 that includes fuel processing system 64 with a hydrogen-producing region 70 that is adapted to produce mixed gas stream 74 by steam reforming one or more feedstock supply streams 68 containing water 80 and at least one carbon-containing feedstock 82. As illustrated, region 70 includes at least one reforming catalyst bed 84 containing one or more suitable reforming catalysts 86. In the illustrative example, the hydrogen-producing region may be referred to as a reforming region, and the mixed gas stream may be referred to as a reformate stream.

As also shown in FIGS. 1 and 2, the mixed gas stream is adapted to be delivered to a separation region, or assembly, 72 which includes at least one PSA assembly 73. PSA assembly 73 separates the mixed gas (or reformate) stream into product hydrogen stream 42 and at least one byproduct stream 76 that contains at least a substantial portion of the impurities, or other gases, present in mixed gas stream 74. Byproduct stream 76 may contain no hydrogen gas, but it typically will contain some hydrogen gas. While not required, it is within the scope of the present disclosure that fuel processing system 64 may be adapted to produce one or more byproduct streams containing sufficient amounts of hydrogen (and/or other) gas(es) to be suitable for use as a fuel, or feedstock, stream for a heating assembly for the fuel processing system. In some embodiments, the byproduct stream may have sufficient fuel value to enable the heating assembly, when present, to maintain the hydrogen-producing region at a desired operating temperature or within a selected range of temperatures.

As illustrated in FIG. 2, the hydrogen-generation assembly includes a temperature modulating assembly in the form of a heating assembly 71 that is adapted to produce a heated exhaust stream 88 that in turn is adapted to heat at least the reforming region of the hydrogen-generation assembly. It is within the scope of the present disclosure that stream 88 may be used to heat other portions of the hydrogen-generation assembly and/or energy-producing system 22.

As indicated in dashed lines in FIG. 2 (and FIG. 1), it is within the scope of the present disclosure that the byproduct stream from the PSA assembly may form at least a portion of the fuel stream for the heating assembly. Also shown in FIG. 2 are air stream 90, which may be delivered from any suitable air source, and fuel stream 92, which contains any combustible fuel (or fuels) suitable for being combusted with air in the heating assembly, such as byproduct stream 76, or a portion thereof.

The term "fuel value," as used herein, refers to the hydrogen and/or other combustible gas content of a gas stream, and/or other measurable characteristics of the gas stream, such as flow rate, chemical composition, and so forth, which individually or collectively relate to the suitability of the gas stream, relative to the configuration of the heating assembly, for being combusted (with air, in some embodiments) to produce a heated exhaust stream adapted to heat a selected component of the hydrogen-generation assembly (the hydrogen-producing region, in some embodiments), for example, to maintain the heated component within a predetermined temperature range for producing a mixed gas stream.

As an illustrative, non-limiting example, a byproduct stream that is highly combustible may have a low fuel value if its flow rate is insufficient, when the stream is combusted in the heating assembly, to produce a suitable heated exhaust stream. This example may describe a byproduct stream that has a minimal, or even a zero, flow rate. As explained in more detail below, operation of a PSA assembly is usually cyclic in nature, and may produce and/or discharge a byproduct stream only intermittently during each cycle. During periods in which the byproduct stream is not produced, the stream may be said to have a low fuel value because it is not present (i.e., has minimal or zero flow rate). In some embodiments, operation of a PSA assembly that has two (or more) adsorbent beds may include one or more equalization steps that involve temporarily interconnecting two beds in order to equalize the pressure in the beds. During such an equalization step, little or no byproduct stream may be exhausted or discharged from a PSA assembly, and the exhausted byproduct stream may be said to have a low fuel value, either because it is not present or is being redirected within the PSA assembly (i.e., by temporarily flowing from one adsorbent bed to the other).

Conversely, a byproduct stream with a comparatively high flow rate may have a low fuel value if the combustible gas component of the stream is insufficient to produce a suitable heated exhaust stream (including gas streams having minimal or even no combustible gas component).

The fuel value of a fuel stream may be variable, such as if a fuel stream has a variable or discontinuous flow rate, fluctuates in its level of combustible fuel content, and so forth. In other words, depending on the nature of the fuel stream, its fuel value may, over a given time increment, fluctuate between being lower than a particular or predetermined fuel value and being greater than the fuel value. The predetermined fuel value may be the fuel value sufficient to produce a heated exhaust stream capable of maintaining the hydrogen-producing region in a predetermined temperature range, also referred to herein as a "threshold fuel value," or may be some other fuel value.

As an illustrative example of temperatures that may be achieved and/or maintained in hydrogen-producing region 70 through the use of heating assembly 71, steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

The temperature ranges discussed herein illustrate examples of suitable temperature ranges for producing the mixed gas stream, and also demonstrate that the temperature range for a particular embodiment or embodiments may be based, at least in part, on the nature of the carbon-containing feedstock.

Correspondingly, the threshold fuel value, or the fuel value of a combustible fuel stream suitable for combustion in a heating assembly that is sufficient to produce a heated exhaust stream capable of maintaining the hydrogen-producing region in a predetermined temperature range, may vary, depending, for example, on the feedstock used. Other factors, such as the implemented structural configuration of the heating assembly, its proximity to the hydrogen-producing region, and so forth, may also relate to the threshold fuel value for a particular embodiment, which may vary even within a particular embodiment. Considering such factors, one or more threshold fuel values may be predetermined for a given embodiment.

The fluctuations in fuel value of a combustible fuel stream may be regular or irregular, and may vary among the fuel streams of a particular embodiment. As noted above in the examples of a byproduct stream, some fluctuations may be cyclical or periodic in nature: a byproduct stream exhausted from a PSA assembly may have a fuel value lower than a predetermined threshold fuel value during an equalization step or when not being produced, even though the fuel value is at least as great as the threshold fuel value at other times. The term "reduced byproduct period" is used herein to describe operational periods when the heating assembly 71 is providing a heated exhaust stream to maintain the hydrogen-producing region within a predetermined temperature range suitable for producing a mixed gas stream 74, during which the byproduct stream from the PSA assembly has a fuel value lower than a predetermined threshold fuel value. As mentioned above, illustrative examples of reduced byproduct periods include periods during which the byproduct stream from the PSA assembly is being used for other purposes, or is not being generated, and so forth.

Returning to the illustrative embodiment shown in FIG. 2, fuel stream 92 is supplied to the heating assembly via a combustion fuel stream supply system 140, which is adapted to fuel receive streams, such as byproduct stream 76 and mixed gas stream 74, and deliver one or more fuel streams 92 having a combined combustion fuel value at least as great as a corresponding, predetermined threshold value to the heating assembly. Combustion fuel stream supply system 140 may optionally receive any other combustible fuel streams, such as the anode exhaust stream from a fuel cell stack, one or more of the above-described carbon-containing feedstocks from the feedstock delivery system, a product hydrogen stream from the PSA assembly, and so forth, as well as fuel streams from storage tanks and other sources. As explained in more detail herein, combustion fuel stream supply system 140 includes a delivery assembly 142 adapted to collect the various combustible fuel streams and selectively deliver one or more fuel streams 92 to the heating assembly. Delivery assembly 142 may further include a reservoir assembly 144 adapted to receive and store one or more combustible fuel streams for use as all or part of a fuel stream 92.

Fuel stream 92 may therefore include one or more of the combustible fuel streams, such as those listed above. For example, when the byproduct stream from the PSA assembly 73 has a fuel value at least as great as a predetermined threshold fuel value, fuel stream 92 may include the byproduct stream as its majority, or even as its only, component. Conversely, when the fuel value of the byproduct stream is lower than the threshold fuel value, the fuel stream 92 may include one or more of the other combustible streams listed above, exclusive of, or in addition to, the byproduct stream or a portion thereof. In this capacity, the one or more other combustible streams may be referred to, either individually or collectively, as an "auxiliary fuel stream." As such, the combustion fuel stream supply system 140, at least in the embodiment illustrated in FIG. 2, is adapted to deliver a fuel stream 92, which includes either the byproduct stream and/or an auxiliary stream, to the heating assembly, such that the one or more streams supplied to the heating assembly have a combined fuel value at least as great as a corresponding, predetermined threshold value.

With continued reference to FIGS. 1 and 2, it is within the scope of the present disclosure that separation region 72 may be implemented within system 22 anywhere downstream from the hydrogen-producing region, and upstream from the fuel cell stack. In the illustrative example shown schematically in FIG. 1, the separation region is depicted as part of the hydrogen-generation assembly, but this construction is not required. It is also within the scope of the present disclosure that the hydrogen-generation assembly may utilize a chemical or physical separation process in addition to PSA assembly 73 to remove or reduce the concentration of one or more selected impurities from the mixed gas stream. When separation assembly 72 utilizes a separation process in addition to PSA, the one or more additional processes may be performed at any suitable location within system 22 and are not required to be implemented with the PSA assembly. An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions to produce hydrogen gas and carbon dioxide from water and carbon monoxide. Illustrative physical separation processes include the use of a physical membrane or other barrier adapted to permit the hydrogen gas to flow therethrough but adapted to prevent at least selected impurities from passing therethrough. These membranes may be referred to as being hydrogen-selective membranes. Illustrative examples of suitable membranes are formed from palladium or a palladium alloy and are disclosed in the references incorporated herein.

The hydrogen-generation assembly 46 preferably is adapted to produce at least substantially pure hydrogen gas, and even more preferably, the hydrogen-generation assembly is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% or even 99.9% pure. Illustrative, nonexclusive examples of suitable fuel processing systems are disclosed in U.S. Pat. Nos. 6,221,117, 5,997,594, 5,861,137, and pending U.S. Patent Application Publication No. 2001/0045061. The complete disclosures of the above-identified patents are hereby incorporated by reference for all purposes.

Hydrogen gas from fuel processing system 64 may be delivered to one or more of the fuel cell stack 24, and/or a storage device 62, via product hydrogen stream 42. Some or all of hydrogen stream 42 may additionally, or alternatively, be delivered, via a suitable conduit, for use in another hydrogen-consuming process, burned for fuel or heat, for example as part of an auxiliary stream supplied to the heating assembly for combustion, or stored for later use. With reference to FIG. 1, the hydrogen gas used as a proton source, or reactant, for fuel cell stack 24 may be delivered to the stack from one or more of fuel processing system 64 and storage device 62. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The cells in stack 24 may be connected in series, parallel, or combinations of series and parallel configurations.

Figure 3:
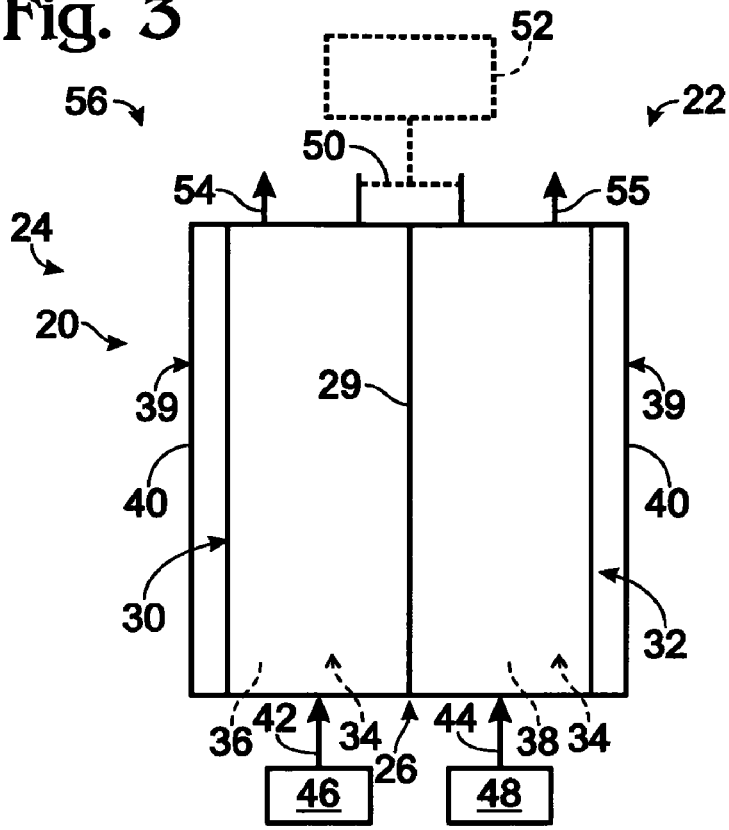
FIG. 3 is a schematic view of a fuel cell, such as may form part of a fuel cell stack used with a hydrogen-generation assembly according to the present disclosure.

FIG. 3 illustrates schematically a fuel cell 20, one or more of which may be configured to form fuel cell stack 24. The fuel cell stacks of the present disclosure may utilize any suitable type of fuel cell, and preferably fuel cells that receive hydrogen and oxygen as proton sources and oxidants. Illustrative examples of types of fuel cells include proton exchange membrane (PEM) fuel cells, alkaline fuel cells, solid oxide fuel cells, molten carbonate fuel cells, phosphoric acid fuel cells, and the like. For the purpose of illustration, an example of a fuel cell 20 in the form of a PEM fuel cell is schematically illustrated in FIG. 3.

Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of a bipolar plate assembly between adjacent fuel cells. The supporting plates 40 of fuel cells 20 typically carry the relative voltage potentials produced by the fuel cells.

In operation, hydrogen gas from product stream 42 is delivered to the anode region, and oxidant 44 is delivered to the cathode region. A typical, but not exclusive, oxidant is oxygen. As used herein, hydrogen refers to hydrogen gas and oxygen refers to oxygen gas. The following discussion will refer to hydrogen as the proton source, or fuel, for the fuel cell (stack), and oxygen as the oxidant, although it is within the scope of the present disclosure that other fuels and/or oxidants may be used. Hydrogen and oxygen 44 may be delivered to the respective regions of the fuel cell via any suitable mechanism from respective sources 47 and 48. Illustrative examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 3. In cathode region 32, electrons from the external circuit and protons from the membrane combine with oxygen to produce water and heat.

Also shown in FIG. 3 are an anode purge, or exhaust, stream 54, which may contain hydrogen gas, and a cathode air exhaust stream 55, which is typically at least partially, if not substantially, depleted of oxygen. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, a fuel cell stack 24 will typically contain a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack. This net flow of electrons produces an electric current that may be used to satisfy an applied load, such as from at least one of an energy-consuming device 52 and the energy-producing system 22.

For a constant output voltage, such as 12 volts or 24 volts, the output power may be determined by measuring the output current. FIG. 1 schematically depicts that energy-producing system 22 may include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Energy-storage device 78 may additionally or alternatively be used to power the energy-producing system 22 during start-up of the system.

The at least one energy-consuming device 52 may be electrically coupled to the energy-producing system 22, such as to the fuel cell stack 24 and/or one or more energy-storage devices 78 associated with the stack. Device 52 applies a load to the energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for the energy-producing system 22 of which fuel cell stack 24 forms a part. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 4:
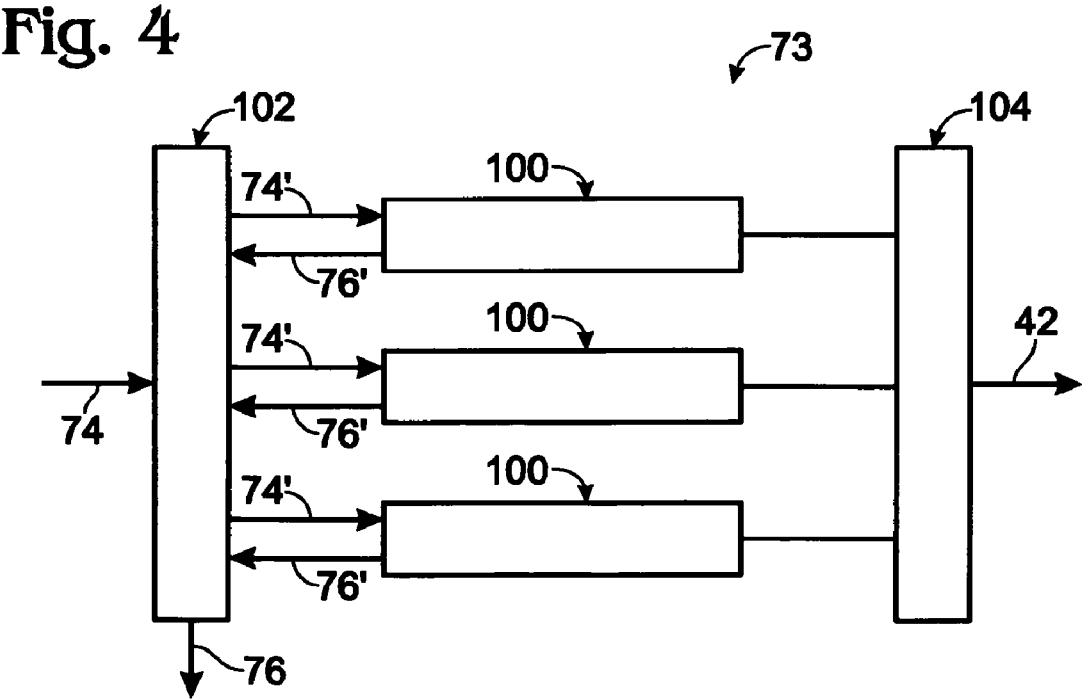
FIG. 4 is a schematic view of a PSA assembly that may be used according to the present disclosure.

In FIG. 4, an illustrative example of a PSA assembly 73 is shown. PSA assembly 73 is shown to include a plurality of adsorbent beds 100 that are fluidly connected via distribution assemblies 102 and 104. Beds 100 may additionally or alternatively be referred to as adsorbent chambers or adsorption regions. The distribution assemblies have been schematically illustrated in FIG. 4 and may include any suitable structure for selectively establishing and restricting fluid flow between the beds and/or the input and output streams of assembly 73. As shown, the input and output streams include at least mixed gas stream 74, product hydrogen stream 42, and byproduct stream 76. Illustrative examples of suitable structures include one or more of manifolds, such as distribution and collection manifolds that are respectively adapted to distribute fluid to and collect fluid from the beds, and valves, such as check valves, solenoid valves, purge valves, and the like. In the illustrative example, three beds 100 are shown, but it is within the scope of the present disclosure that the number of beds may vary, such as to include more or fewer beds than shown in FIG. 4. Typically, assembly 73 will include at least two beds, and often will include three, four, or more beds. While not required, assembly 73 is preferably adapted to provide a continuous flow of product hydrogen stream, with at least one of the plurality of beds exhausting this stream when the assembly is in use and receiving a continuous flow of mixed gas stream 74.

In the illustrative example, distribution assembly 102 is adapted to selectively deliver mixed gas stream 74 to the plurality of beds and to collect byproduct stream 76, for example to exhaust byproduct stream from the PSA assembly 73, or in some embodiments to selectively redirect at least a portion of the byproduct stream to another of the beds 100, for example during one or more equalization steps. Distribution assembly 104 is adapted to collect the purified hydrogen gas that passes through the beds and which forms product hydrogen stream 42, and in some embodiments to deliver a portion of the purified hydrogen gas to the beds for use as a purge stream. The distribution assemblies may be configured for fixed or rotary positioning relative to the beds. Furthermore, the distribution assemblies may include any suitable type and number of structures and devices to selectively distribute, regulate, meter, prevent and/or collect flows of the corresponding gas streams. As illustrative, non-exclusive examples, distribution assembly 102 may include mixed gas and exhaust manifolds, or manifold assemblies, and distribution assembly 104 may include product and purge manifolds, or manifold assemblies. In practice, PSA assemblies that utilize distribution assemblies that rotate relative to the beds may be referred to as rotary pressure swing adsorption assemblies, and PSA assemblies in which the manifolds and beds are not adapted to rotate relative to each other to selectively establish and restrict fluid connections may be referred to as fixed bed, or discrete bed, pressure swing adsorption assemblies. Both constructions are within the scope of the present disclosure.

Gas purification by pressure swing adsorption involves sequential pressure cycling and flow reversal of gas streams relative to the adsorbent beds. In the context of purifying a mixed gas stream comprised substantially of hydrogen gas, the mixed gas stream is delivered under relatively high pressure to one end of the adsorbent beds and thereby exposed to the adsorbent(s) contained in the adsorbent region thereof. Illustrative examples of delivery pressures for mixed gas stream 74 include pressures in the range of 40-200 psi, such as pressures in the range of 50-150 psi, 50-100 psi, 100-150 psi, 70-100 psi, etc., although pressures outside of this range are within the scope of the present disclosure. As the mixed gas stream flows through the adsorbent region, carbon monoxide, carbon dioxide, water and/or other ones of the impurities, or other gases, are adsorbed, and thereby at least temporarily retained, on the adsorbent. This is because these gases are more readily adsorbed on the selected adsorbents used in the PSA assembly. The remaining portion of the mixed gas stream, which now may perhaps more accurately be referred to as a purified hydrogen stream, passes through the bed and is exhausted from the other end of the bed. In this context, hydrogen gas may be described as being the less readily adsorbed component, while carbon monoxide, carbon dioxide, etc. may be described as the more readily adsorbed components of the mixed gas stream. The pressure of the product hydrogen stream is typically reduced prior to utilization of the gas by the fuel cell stack.

To remove the adsorbed gases, the flow of the mixed gas stream is stopped, the pressure in the bed is reduced, and the now desorbed gases are exhausted from the bed and, typically, from the PSA assembly as byproduct stream 76. The desorption step often includes selectively decreasing the pressure within the adsorbent region through the withdrawal of gas, typically in a countercurrent direction relative to the feed direction. This desorption step may also be referred to as a depressurization, or blowdown, step. This step often includes or is performed in conjunction with the use of a purge gas stream, which is typically delivered in a countercurrent flow direction to the direction at which the mixed gas stream flows through the adsorbent region. An illustrative example of a suitable purge gas stream is a portion of the product hydrogen stream, as this stream is comprised of hydrogen gas, which is less readily adsorbed than the adsorbed gases. Other gases may be used in the purge gas stream, although these gases preferably are less readily adsorbed than the adsorbed gases, and even more preferably are not adsorbed, or are only weakly adsorbed, on the adsorbent(s) being used.

As discussed, this desorption step may include drawing an at least partial vacuum on the bed, but this is not required. While not required, it is often desirable to utilize one or more equalization steps, in which two or more beds are fluidly interconnected to permit the beds to equalize the relative pressures therebetween. For example, one or more equalization steps may precede the desorption and pressurization steps. Prior to the desorption step, equalization is used to reduce the pressure in the bed and to recover some of the purified hydrogen gas contained in the bed, while prior to the (re)pressurization step, equalization is used to increase the pressure within the bed. Equalization may be accomplished using cocurrent and/or countercurrent flow of gas. After the desorption and/or purge step(s) of the desorbed gases is completed, the bed is again pressurized and ready to again receive and remove impurities from the portion of the mixed gas stream delivered thereto.

For example, when a bed is ready to be regenerated, it is typically at a relatively high pressure and contains a quantity of hydrogen gas. While this gas (and pressure) may be removed simply by venting the bed, other beds in the assembly will need to be pressurized prior to being used to purify the portion of the mixed gas stream delivered thereto. Furthermore, the hydrogen gas in the bed to be regenerated preferably is recovered so as to not negatively impact the efficiency of the PSA assembly. Therefore, interconnecting these beds in fluid communication with each other permits reduction of the pressure and hydrogen gas in the bed to be regenerated while also increasing the pressure and hydrogen gas in a bed that will be used to purify impure hydrogen gas (i.e., mixed gas stream 74) that is delivered thereto.

As mentioned above, although gas flows between adsorbent beds that are interconnected during an equalization step, little or no gas is exhausted from the PSA assembly. Instead, gas streams such as the purified hydrogen gas streams, and/or those that include desorbed gases, are redirected within the PSA assembly during an equalization step. More specifically, for example, a purge or byproduct stream that includes desorbed gases intended to be exhausted from the PSA assembly instead may flow between interconnected beds during an equalization step. As such, in embodiments in which the byproduct gas stream from the PSA assembly is used as a fuel stream for the heating assembly, an equalization step may result in a temporary interruption in the flow of combustible fuel.

Or, as expressed in terms as described above, an equalization step is an example of a reduced byproduct period during which the byproduct stream has a fuel value less than a predetermined threshold value sufficient to produce a heated exhaust stream capable of maintaining the hydrogen-producing region in a predetermined temperature range. However, as explained in greater detail below, a combustion fuel stream supply system may be adapted, during reduced byproduct periods, to deliver an auxiliary fuel stream to the heating assembly.

In addition to, or in place of, one or more equalization steps, a bed that will be used to purify the mixed gas stream may be pressurized prior to the delivery of the mixed gas stream to the bed. For example, some of the purified hydrogen gas may be delivered to the bed to pressurize the bed. While it is within the scope of the present disclosure to deliver this pressurization gas to either end of the bed, in some embodiments it may be desirable to deliver the pressurization gas to the opposite end of the bed than to the end of the bed to which the mixed gas stream is delivered.

The above discussion of the general operation of a PSA assembly has been somewhat simplified. Illustrative examples of pressure swing adsorption assemblies, including components thereof and methods of operating the same, are disclosed in U.S. Pat. Nos. 3,564,816, 3,986,849, 5,441,559, 6,692,545, and 6,497,856, the complete disclosures of which are hereby incorporated by reference for all purposes.

Figure 5:
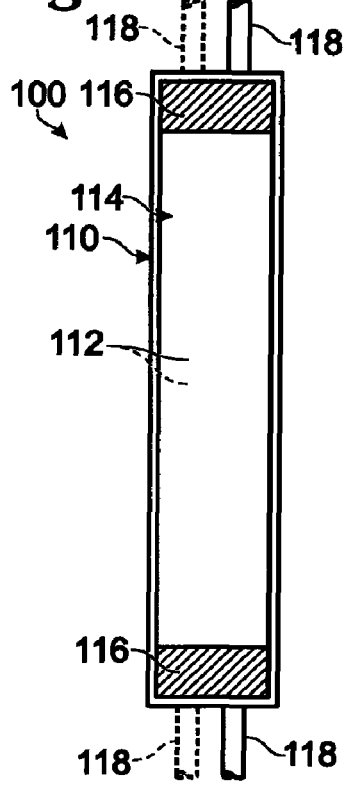
FIG. 5 is a schematic cross-sectional view of an adsorbent bed that may be used with PSA assemblies according to the present disclosure.

In FIG. 5, an illustrative example of an adsorbent bed 100 is schematically illustrated. As shown, the bed defines an internal compartment 110 that contains at least one adsorbent 112, with each adsorbent being adapted to adsorb one or more of the components of the mixed gas stream. It is within the scope of the present disclosure that more than one adsorbent may be used. For example, a bed may include more than one adsorbent adapted to adsorb a particular component of the mixed gas stream, such as to adsorb carbon monoxide, and/or two or more adsorbents that are each adapted to adsorb a different component of the mixed gas stream. Similarly, an adsorbent may be adapted to adsorb two or more components of the mixed gas stream. Illustrative examples of suitable adsorbents include activated carbon, alumina and zeolite adsorbents. An additional example of an adsorbent that may be present within the adsorbent region of the beds is a desiccant that is adapted to adsorb water present in the mixed gas stream. Illustrative desiccants include silica and alumina gels. When two or more adsorbents are utilized, they may be sequentially positioned (in a continuous or discontinuous relationship) within the bed or may be mixed together. It should be understood that the type, number, amount and form of adsorbent in a particular PSA assembly may vary, such as according to one or more of the following factors: the operating conditions expected in the PSA assembly, the size of the adsorbent bed, the composition and/or properties of the mixed gas stream, the desired application for the product hydrogen stream produced by the PSA assembly, the operating environment in which the PSA assembly will be used, user preferences, etc.

When the PSA assembly includes a desiccant or other water-removal composition or device, it may be positioned to remove water from the mixed gas stream prior to adsorption of other impurities from the mixed gas stream. One reason for this is that water may negatively affect the ability of some adsorbents to adsorb other components of the mixed gas stream, such as carbon monoxide. An illustrative example of a water-removal device is a condenser, but others may be used between the hydrogen-producing region and adsorbent region, as schematically illustrated in dashed lines at 122 in FIG. 1. For example, at least one heat exchanger, condenser or other suitable water-removal device may be used to cool the mixed gas stream prior to delivery of the stream to the PSA assembly. This cooling may condense some of the water present in the mixed gas stream. Continuing this example, and to provide a more specific illustration, mixed gas streams produced by steam reformers tend to contain at least 10%, and often at least 15% or more water when exhausted from the hydrogen-producing (i.e., the reforming) region of the fuel processing system. These streams also tend to be fairly hot, such as having a temperature of at least 300° C. (in the case of many mixed gas streams produced from methanol or similar carbon-containing feedstocks), and at least 600-800° C. (in the case of many mixed gas streams produced from natural gas, propane or similar carbon-containing feedstocks). When cooled prior to delivery to the PSA assembly, such as to an illustrative temperature in the range of 25-100° C. or even 40-80° C., most of this water will condense. The mixed gas stream may still be saturated with water, but the water content will tend to be less than 5 wt %.

The adsorbent(s) may be present in the bed in any suitable form, illustrative examples of which include particulate form, bead form, porous discs or blocks, coated structures, laminated sheets, fabrics, and the like. When positioned for use in the beds, the adsorbents should provide sufficient porosity and/or gas flow paths for the non-adsorbed portion of the mixed gas stream to flow through the bed without significant pressure drop through the bed. As used herein, the portion of a bed that contains adsorbent will be referred to as the adsorbent region of the bed. In FIG. 5, an adsorbent region is indicated generally at 114. Beds 100 also may (but are not required to) include partitions, supports, screens and other suitable structure for retaining the adsorbent and other components of the bed within the compartment, in selected positions relative to each other, in a desired degree of compression, etc. These devices are generally referred to as adsorbent supports and are generally indicated in FIG. 5 at 116. Therefore, it is within the scope of the present disclosure that the adsorbent region may correspond to the entire internal compartment of the bed, or only a subset thereof. Similarly, the adsorbent region may be comprised of a continuous region or two or more spaced apart regions without departing from the scope of the present disclosure.

Figure 6:
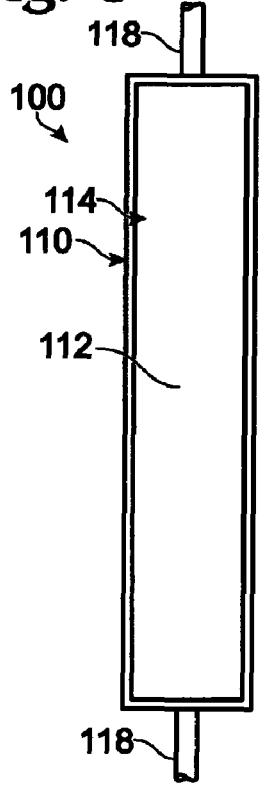
FIG. 6 is a schematic cross-sectional view of another adsorbent bed that may be used with PSA assemblies according to the present disclosure.
Figure 7:
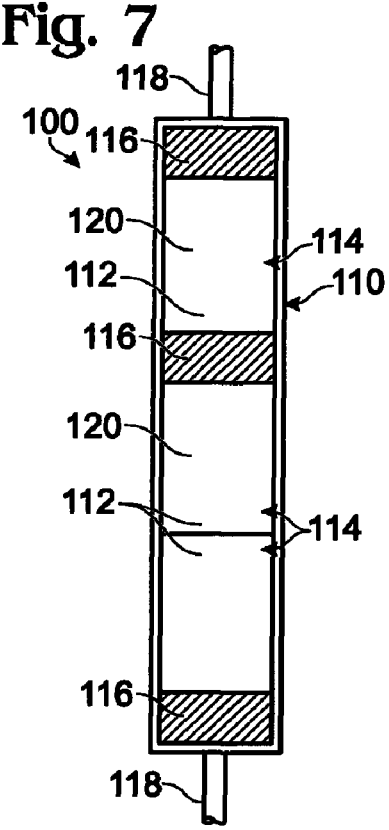
FIG. 7 is a schematic cross-sectional view of another adsorbent bed that may be used with PSA assemblies according to the present disclosure.

In the illustrated example shown in FIG. 5, bed 100 includes at least one port 118 associated with each end region of the bed. As indicated in dashed lines, it is within the scope of the present disclosure that either or both ends of the bed may include more than one port. Similarly, it is within the scope of the disclosure that the ports may extend laterally from the beds or otherwise have a different geometry than the schematic examples shown in FIG. 5. Regardless of the configuration and/or number of ports, the ports are collectively adapted to deliver fluid for passage through the adsorbent region of the bed and to collect fluid that passes through the adsorbent region. As discussed, the ports may selectively, such as depending upon the particular implementation of the PSA assembly and/or stage in the PSA cycle, be used as an input port or an output port. For the purpose of providing a graphical example, FIG. 6 illustrates a bed 100 in which the adsorbent region extends along the entire length of the bed, i.e., between the opposed ports or other end regions of the bed. In FIG. 7, bed 100 includes an adsorbent region 114 that includes discontinuous subregions 120.

During use of an adsorbent bed, such as bed 100, to adsorb impurity gases (namely the gases with greater affinity for being adsorbed by the adsorbent), a mass transfer zone will be defined in the adsorbent region. More particularly, adsorbents have a certain adsorption capacity, which is defined at least in part by the composition of the mixed gas stream, the flow rate of the mixed gas stream, the operating temperature and/or pressure at which the adsorbent is exposed to the mixed gas stream, any adsorbed gases that have not been previously desorbed from the adsorbent, etc. As the mixed gas stream is delivered to the adsorbent region of a bed, the adsorbent at the end portion of the adsorbent region proximate the mixed gas delivery port will remove impurities from the mixed gas stream. Generally, these impurities will be adsorbed within a subset of the adsorbent region, and the remaining portion of the adsorbent region will have only minimal, if any, adsorbed impurity gases. This is somewhat schematically illustrated in FIG. 8, in which adsorbent region 114 is shown including a mass transfer zone, or region, 130.

As the adsorbent in the initial mass transfer zone continues to adsorb impurities, it will near or even reach its capacity for adsorbing these impurities. As this occurs, the mass transfer zone will move toward the opposite end of the adsorbent region. More particularly, as the flow of impurity gases exceeds the capacity of a particular portion of the adsorbent region (i.e., a particular mass transfer zone) to adsorb these gases, the gases will flow beyond that region and into the adjoining portion of the adsorbent region, where they will be adsorbed by the adsorbent in that portion, effectively expanding and/or moving the mass transfer zone generally toward the opposite end of the bed.

Figure 8:
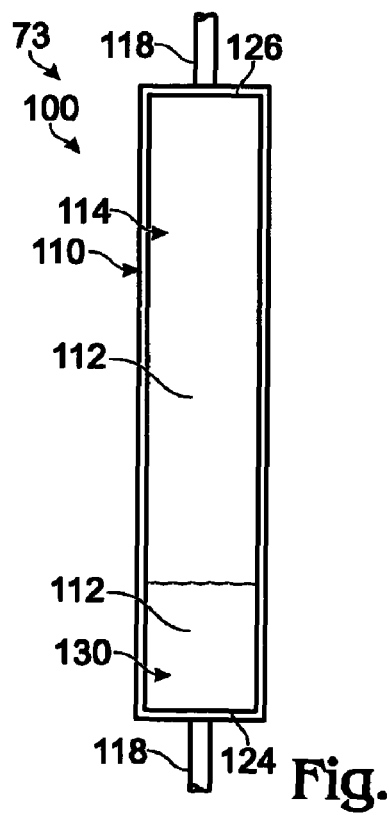
FIG. 8 is a schematic cross-sectional view of the adsorbent bed of FIG. 6 with a mass transfer zone being schematically indicated.
Figure 9:
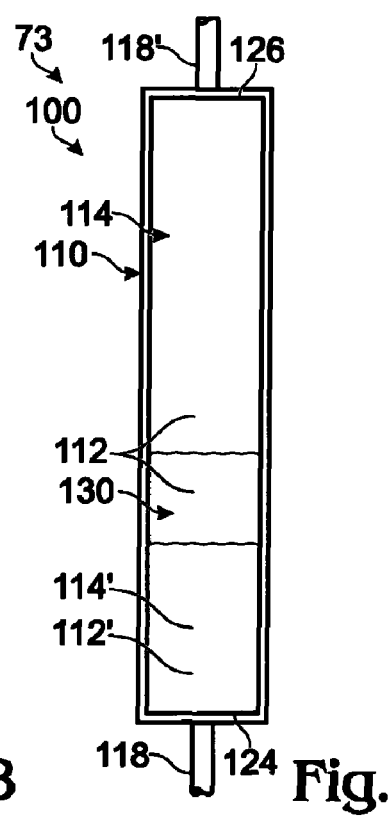
FIG. 9 is a schematic cross-sectional view of the adsorbent bed of FIG. 8 with the mass transfer zone moved along the adsorbent region of the bed toward a distal, or product, end of the adsorbent region.

This description is somewhat simplified in that the mass transfer zone often does not define uniform beginning and ending boundaries along the adsorbent region, especially when the mixed gas stream contains more than one gas that is adsorbed by the adsorbent. Similarly, these gases may have different affinities for being adsorbed and therefore may even compete with each other for adsorbent sites. However, a substantial portion (such as at least 70% or more) of the adsorption will tend to occur in a relatively localized portion of the adsorbent region, with this portion, or zone, tending to migrate from the feed end to the product end of the adsorbent region during use of the bed. This is schematically illustrated in FIG. 9, in which mass transfer zone 130 is shown moved toward port 118' relative to its position in FIG. 8. Accordingly, the adsorbent 112' in portion 114' of the adsorbent region will have a substantially reduced capacity, if any, to adsorb additional impurities. Described in other terms, adsorbent 112' may be described as being substantially, if not completely, saturated with adsorbed gases. In FIGS. 8 and 9, the feed and product ends of the adsorbent region are generally indicated at 124 and 126 respectively, and generally refer to the portions of the adsorbent region that are proximate, or closest to, the mixed gas delivery port and the product port of the bed.

During use of the PSA assembly, the mass transfer zone will tend to migrate toward and away from ends 124 and 126 of the adsorbent region. More specifically, and as discussed, PSA is a cyclic process that involves repeated changes in pressure and flow direction. The following discussion will describe the PSA cycle with reference to how steps in the cycle tend to affect the mass transfer zone (and/or the distribution of adsorbed gases through the adsorbent region). It should be understood that the size, or length, of the mass transfer zone will tend to vary during use of the PSA assembly, and therefore tends not to be of a fixed dimension.

At the beginning of a PSA cycle, the bed is pressurized and the mixed gas stream flows under pressure through the adsorbent region. During this adsorption step, impurities (i.e., the other gases) are adsorbed by the adsorbent(s) in the adsorbent region. As these impurities are adsorbed, the mass transfer zone tends to move toward the distal, or product, end of the adsorbent region as initial portions of the adsorbent region become more and more saturated with adsorbed gas. When the adsorption step is completed, the flow of mixed gas stream 74 to the adsorbent bed and the flow of purified hydrogen gas (at least a portion of which will form product hydrogen stream 42) are stopped. While not required, the bed may then undergo one or more equalization steps in which the bed is fluidly interconnected with one or more other beds in the PSA assembly to decrease the pressure and hydrogen gas present in the bed and to charge the receiving bed(s) with pressure and hydrogen gas. Gas may be withdrawn from the pressurized bed from either, or both of, the feed or the product ports. Drawing the gas from the product port will tend to provide hydrogen gas of greater purity than gas drawn from the feed port. However, the decrease in pressure resulting from this step will tend to draw impurities in the direction at which the gas is removed from the adsorbent bed. Accordingly, the mass transfer zone may be described as being moved toward the end of the adsorbent bed closest to the port from which the gas is removed from the bed. Expressed in different terms, when the bed is again used to adsorb impurities from the mixed gas stream, the portion of the adsorbent region in which the majority of the impurities are adsorbed at a given time, i.e., the mass transfer zone, will tend to be moved toward the feed or product end of the adsorbent region depending upon the direction at which the equalization gas is withdrawn from the bed.

The bed is then depressurized, with this step typically drawing gas from the feed port because the gas stream will tend to have a higher concentration of the other gases, which are desorbed from the adsorbent as the pressure in the bed is decreased. This exhaust stream may be referred to as a byproduct, or impurity stream, 76, which, as previously mentioned, may be used for a variety of applications, including as a fuel stream for a burner or other heating assembly that combusts a fuel stream to produce a heated exhaust stream. As discussed, hydrogen-generation assembly 46 may include a heating assembly 71 that is adapted to produce a heated exhaust stream to heat at least the hydrogen-producing region 70 of the fuel processing system. According to Henry's Law, the amount of adsorbed gases that are desorbed from the adsorbent is related to the partial pressure of the adsorbed gas present in the adsorbent bed. Therefore, the depressurization step may include, be followed by, or at least partially overlap in time, with a purge step, in which gas, typically at low pressure, is introduced into the adsorbent bed. This gas flows through the adsorbent region and draws the desorbed gases away from the adsorbent region, with this removal of the desorbed gases resulting in further desorption of gas from the adsorbent. As discussed, a suitable purge gas is purified hydrogen gas, such as previously produced by the PSA assembly. Typically, the purge stream flows from the product end to the feed end of the adsorbent region to urge the impurities (and thus reposition the mass transfer zone) toward the feed end of the adsorbent region. It is within the scope of the disclosure that the purge gas stream may form a portion of the byproduct stream, may be used as a combustible fuel stream (such as for heating assembly 71), and/or may be otherwise utilized in the PSA or other processes.

The illustrative example of a PSA cycle is now completed, and a new cycle is typically begun. For example, the purged adsorbent bed is then repressurized, such as by being a receiving bed for another adsorbent bed undergoing equalization, and optionally may be further pressurized by purified hydrogen gas delivered thereto. By utilizing a plurality of adsorbent beds, such as three or more, the PSA assembly may be adapted to receive a continuous flow of mixed gas stream 74 and to produce a continuous flow of purified hydrogen gas (i.e., a continuous flow of product hydrogen stream 42). While not required, the time for the adsorption step, or stage, often represents one-third to two-thirds of the PSA cycle, such as representing approximately half of the time for a PSA cycle.

Regardless, it is important to stop the adsorption step before the mass transfer zone reaches the distal end (relative to the direction at which the mixed gas stream is delivered to the adsorbent region) of the adsorbent region. In other words, the flow of mixed gas stream 74 and the removal of product hydrogen stream 42 preferably should be stopped before the other gases that are desired to be removed from the hydrogen gas are exhausted from the bed with the hydrogen gas. This is due to the fact that the adsorbent is saturated with adsorbed gases and therefore can no longer effectively prevent these impurity gases from being exhausted in what desirably is a purified hydrogen stream. This contamination of the product hydrogen stream with impurity gases that desirably are removed by the PSA assembly may be referred to as breakthrough, in that the impurities gases "break through" the adsorbent region of the bed. Conventionally, carbon monoxide detectors have been used to determine when the mass transfer zone is nearing or has reached the distal end of the adsorbent region and thereby is, or will, be present in the product hydrogen stream. Carbon monoxide detectors are used more commonly than detectors for other ones of the other gases present in the mixed gas stream because carbon monoxide can damage many fuel cells when present in even a few parts per million (ppm).

As introduced in connection with FIG. 4, PSA assembly 73 includes distribution assemblies 102 and 104 that selectively deliver and/or collect mixed gas stream 74, product hydrogen stream 42, and byproduct stream 76 to and from the plurality of adsorbent beds 100. Somewhat more specifically, distribution assembly 102 is adapted, in some embodiments via one or more suitable distribution or collection manifolds, to selectively distribute the mixed gas stream to feed ends of the adsorbent beds 100, as indicated at 74'. Distribution assembly 102 is also adapted to collect gas exhausted from the feed ends of the adsorbent beds, namely, the desorbed other gases, purge gas, and other gas that is not harvested to form product hydrogen stream 42. These exhaust streams are indicated at 76' in FIG. 4 and collectively form byproduct stream 76. As discussed, product hydrogen stream 42 is formed from the purified hydrogen gas streams produced in the adsorbent regions of the adsorbent beds. It is within the scope of the present disclosure that some of this gas may be used as a purge gas stream that is selectively delivered (such as via an appropriate distribution manifold) to the adsorbent beds during the purge and/or blowdown steps to promote the desorption and removal of the adsorbed gases for the adsorbent. The desorbed gases, as well as the purge gas streams that are withdrawn from the adsorbent beds with the desorbed gases collectively may form byproduct stream 76, which as discussed, may be used as a fuel stream for heating assembly 71 or other device that is adapted to receive a combustible fuel stream, such as via combustible fuel stream supply system 140 (FIG. 2).

Figure 10:
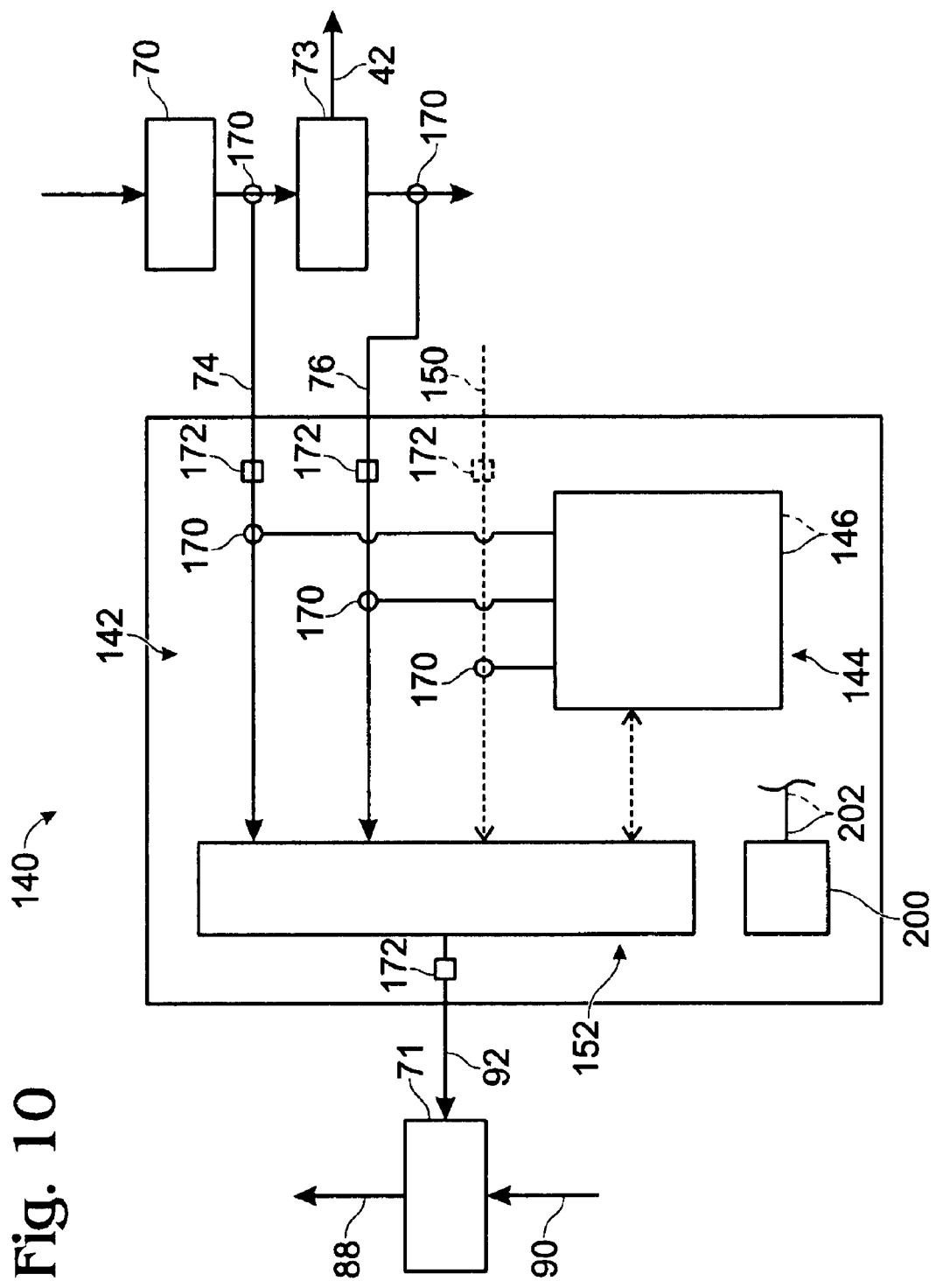
FIG. 10 is a schematic view of a combustion fuel stream supply system suitable for use with the hydrogen-producing assembly of FIG. 2.

An illustrative and non-exclusive example of a fuel stream supply system 140 is shown schematically in FIG. 10. Fuel stream supply system 140 includes a delivery assembly, generally indicated at 142, that is adapted to receive and collect various combustible fuel streams, and to selectively deliver one or more fuel streams 92 having a combined fuel value at least as great as a corresponding, predetermined threshold value to heating assembly 71. In the example shown in FIG. 10, delivery assembly 142 is adapted to receive a portion of byproduct stream 76 from the PSA assembly 73, as well as a portion of mixed gas stream 74 from the hydrogen-producing region 70 prior to its delivery to the PSA assembly. Delivery assembly 142 optionally may receive other fuel streams, which are represented generally at 150. Examples of such optional fuel streams include one or more other combustible streams from other sources within hydrogen-generation assembly 46 or energy-producing system 22, such as portions of one or more of the product hydrogen stream produced by the PSA assembly, a fuel supply stream from the feedstock delivery system, the anode exhaust stream from a fuel cell, and so forth, as well as fuel streams from storage tanks and other sources.

Although not required to all embodiments, delivery assembly 142 is shown to include a reservoir assembly 144, which further includes a reservoir 1 46, which is adapted to receive and store at least some of the portion of the byproduct stream 76 that is directed from the PSA assembly to the fuel stream supply system 140. Of course, a reservoir assembly may include any number of reservoirs 146 suitable to store one or more combustible fuel streams for reuse as all or part of a fuel stream 92. In some embodiments, a reservoir 146 may be adapted to store a portion of any number of different fuel and fluid streams for reuse, or embodiments optionally may include additional reservoirs 146 for storage and reuse of other combustible fuels, and/or multiple reservoirs for storage and reuse of one or more combustible fuels, as desired. For example, FIG. 10 schematically illustrates that a portion of the mixed gas stream 74 that is directed from the hydrogen-producing region 70 to the fuel stream supply system 40, and/or a portion of one or more other gas streams 150 that are directed to the fuel stream supply system 140, may be stored for reuse in one or more reservoirs 146 of reservoir assembly 144, which may be different from, or the same as, the reservoir(s) 146 to which a portion of the byproduct stream is directed.

Although also not required to all embodiments, delivery assembly 142 is shown to include a collection assembly 152, which may function to collect one or more streams and distribute fuel stream(s) 92 to the heating assembly. Thus, although collection assembly 152 is only schematically illustrated in FIG. 10, it may include any suitable structure to selectively establish, distribute, restrict, regulate, meter, prevent, and/or collect flow of one or more of the fuel streams shown, combine one or more streams, and deliver one or more streams 92 to the heating assembly. Illustrative examples of such suitable structures include one or more manifolds, such as collection and distribution manifolds respectively adapted to collect one or more of the various streams, and deliver one or more fuel streams 92. In an implemented embodiment of fuel stream supply system 140, any suitable number, structure and construction of manifolds and fluid conduits for the fluid streams discussed herein may be utilized.

The delivery assembly 142 in FIG. 10 is schematically illustrated to include several flow-regulating devices, indicated generally at 170, which may function to direct or otherwise regulate the flow of a fuel stream toward the reservoir assembly 144 and/or toward the collection assembly 152 (if present) or directly to the heating assembly 71, individually or in combination with other fuel streams. Delivery assembly 142 is also schematically shown to include sensors 172, which may function to measure fuel values of the various incoming fuel and fluid streams. In implemented embodiments, any suitable number and type of valves or other flow-regulating devices 170, and/or sensors or other property detectors 172, may be utilized. Examples of sensors and property detectors 172 include flow meters, pressure sensors, temperature sensors, composition detectors (such as carbon monoxide or other detectors, to detect the concentration, if any, of a target molecule or compound in a fluid or fuel stream), and so forth. Examples of flow-regulating devices 170 include check valves, proportioning or other solenoid valves, pressure relief valves, variable orifice valves, fixed orifices, and so forth. One or more of such valves, sensors, and like devices may be adapted to monitor the fuel value of the various fuel and fluid streams, by detecting the combustible gas content of a stream, its flow rate, chemical composition, and so forth, and may be positioned as appropriate within fuel stream supply system 140. For example, FIG. 10 shows a sensor 172 disposed along each of redirected mixed gas stream 74, byproduct stream 76, and gas stream(s) 150, for example to monitor the fuel value of each fuel stream, upstream of flow-regulating devices 170, which may direct all or a portion of each stream toward reservoir assembly 144. However, sensors 172 may be positioned elsewhere, or may be incorporated into the various other structural components shown (for example, within hydrogen-producing region 70 and/or PSA assembly 73, collection assembly 152, and so forth). Such valves, sensors, and like devices may thus be disposed as desired within and throughout the hydrogen-generation assembly 46. Optionally, one or more other sections of the hydrogen-generation assembly may include flow-regulating devices 170 and sensors 172, for example to monitor the fuel value of various fuel and fluid streams. For example, PSA assembly 73 may be adapted to monitor the fuel value of the byproduct stream 76 produced by, and/or exhausted from, the adsorbent beds of the PSA assembly.

While not required, it is within the scope of the present disclosure that the fuel stream supply system may include, be associated with, and/or be in communication with a controller that is adapted to control the operation of at least portions of the PSA assembly and/or an associated hydrogen-generation assembly and/or fuel cell system. A controller is schematically illustrated in FIGS. 2 and 10 and generally indicated at 200. Controller 200 may communicate with at least the flow-regulating devices 170 and/or property detectors 172 via any suitable wired and/or wireless communication linkage, as schematically illustrated in FIG. 10 at 202. This communication may include one- or two-way communication and may include such communication signals as inputs and/or outputs corresponding to measured or computed values, command signals, status information, user inputs, values to be stored, threshold values, etc. As illustrative, non-exclusive examples, controller 200 may include one or more analog or digital circuits, logic units or processors for operating programs stored as software in memory, one or more discrete units in communication with each other, etc. Controller 200 may also regulate or control other portions of the hydrogen-generation assembly or fuel cell system and/or may be in communication with other controllers adapted to control the operation of the hydrogen-generation assembly and/or fuel cell system. Controller 200 is illustrated in both FIGS. 2 and 10 as being implemented as separate components or controllers, but it may also be implemented as a discrete unit. Such separate controllers, then, can communicate with each other and/or with other controllers present in system 22 and/or assembly 46 via any suitable communication linkages.

In the illustrated embodiments, fuel stream supply system 140 may be adapted, such as via controller(s) 200, flow-regulating devices 170 and/or property detectors 172, to monitor the fuel value of one or more fuel streams directed to the fuel stream supply system to provide one or more fuel streams 92 having a combined fuel value at least as great as a corresponding, predetermined threshold value. Fuel stream supply system 140 may supply either the byproduct stream, when the byproduct stream from the PSA assembly 73 has a fuel value at least as great as a predetermined threshold fuel value, and/or an auxiliary stream, during a reduced byproduct period (or otherwise) when the fuel value of the byproduct stream is lower than the threshold fuel value. In the latter case, the fuel stream 92 supplied by the fuel stream supply system may include an auxiliary stream, exclusive of, or in addition to, the byproduct stream or a portion thereof.

The auxiliary stream(s) supplied during a reduced byproduct period, or when otherwise desired, may be provided as one or more "slip streams," or streams that are directed, via the fuel stream supply system, to the heating assembly directly from the source of the stream (e.g., mixed gas stream 74 from hydrogen-producing region 70), as stored streams directed from the reservoir assembly to the heating assembly (e.g., a stored byproduct stream from reservoir assembly 146), or a combination of slip and stored streams. The auxiliary stream(s) may be delivered via one or more valves and other flow-regulating devices 170 that may be opened and closed responsive to control signals. In some embodiments, the control signals may be generated responsive to the monitored fuel value of a fuel stream, such as in programmed intervals that correlate with the PSA assembly's cycles, or otherwise as suitable to ensure a continuous flow of combustible fuel to the heating assembly that is sufficient, when combusted, to produce a heated exhaust stream to maintain the hydrogen producing region within a desired temperature range. In a somewhat simplified example, the fuel stream supply system may be configured to automatically supply an auxiliary stream consisting of a slip stream of reformate from the hydrogen-producing region when the PSA assembly cycles through an equalization step. However, this example is only illustrative of several possible methods that may be practiced using the concepts and components described herein.

Any suitable method or mechanism may be utilized for supplying one or more fuel streams 92 (which may include one or more auxiliary streams) to the heating assembly. An illustrative, non-exclusive example is the use of controller 200 to selectively actuate suitable flow-regulating valves to produce the desired stream composition, responsive to the fuel value of various available fuel streams. As discussed, any suitable type and number of valves and sensors may be used, and it is within the scope of the present disclosure that the valves, sensors, and assemblies that regulate the flow of gas that will form stream(s) 92 may be selectively used, such as responsive to control signals from a controller.

Controller 200 may operate in conjunction with flow-regulating devices 170 and sensors 172 to determine periods during which at least a portion of one or more fuel or fluid streams directed to the fuel stream supply system 140 are selectively directed to the reservoir assembly instead of to the heating assembly. For example, if a byproduct stream from the PSA assembly has at least a predetermined threshold fuel value, or has a fuel value greater than the predetermined threshold fuel value, the byproduct stream or a portion thereof may be directed or diverted to the reservoir assembly for storage and later reuse as an auxiliary fuel stream, such as during a reduced byproduct period.

As mentioned briefly above, during such a period, the auxiliary fuel stream may consist of one or more streams, illustrative and non-exclusive examples of which include the following:

solely the stored byproduct stream,
  at least a portion of the stored byproduct stream together with at least a portion of the byproduct stream discharged from the PSA assembly,
  at least a portion of the stored byproduct stream together with at least a portion of the mixed gas stream redirected to the fuel stream supply system prior to delivery to the PSA assembly,
  at least a portion of the stored byproduct stream together with at least a portion of the redirected mixed gas stream stored in the reservoir assembly,
  solely the redirected mixed gas stream, and
  at least a portion of the redirected mixed gas stream together with at least a portion of the byproduct stream discharged from the PSA assembly.

This list is not exhaustive, because many variations and combinations of the aforementioned combustible fuel streams, individually, collectively, and/or together with other available and/or stored combustible fuel streams, are available and considered to be within the scope of this disclosure.

As an illustrative and non-exclusive example of the operation of fuel stream supply system 140, during an equalization step of the PSA assembly, a stream 76' may have a low flow rate and/or a low fuel value. As a result, the heating assembly may not be able to maintain a pilot light or combustion flame without requiring a flow of fuel other than byproduct stream 76. Similarly, when the flow rate and/or fuel value of stream 76 is low, the heated exhaust stream may not be able to heat the associated structure, such as hydrogen-producing region 70, to a desired temperature or range of temperatures. However, the fuel stream supply system may be adapted to selectively supply, when a byproduct stream having at least a predetermined threshold fuel value is not discharged from the PSA assembly, an auxiliary fuel stream to the heating assembly, such that the one or more streams supplied to the heating assembly have a combined combustion fuel value at least as great as the corresponding, predetermined threshold value.

In some embodiments, the collective threshold fuel value of the fuel stream(s) may produce a heated exhaust stream adapted to maintain the hydrogen-producing region of the fuel processing system at a desired temperature and/or within a desired temperature range, such as those discussed previously. For example, the heated exhaust stream may be adapted to maintain the hydrogen-producing region, which in some embodiments may be referred to as a reforming region, of the hydrogen-generation assembly at a relatively constant temperature. Illustrative, non-exclusive examples include a temperature in the range of 375-425° C., 400-425° C. and/or 400-450° C. for methanol or similar carbon-containing feedstocks and a temperature in the range of 750-850° C., 775-

825° C., 800-850° C., and/or 800-825° C. for natural gas, propane and similar carbon-containing feedstocks.

Using the subject matter discussed above as embodied in a hydrogen-generation assembly 46 that includes a fuel stream supply system 140, an illustrative and non-exclusive example of a method of supplying one or more fuel streams having at least a combined threshold combustion fuel value to a heating assembly adapted to receive and combust such a combustion stream, and for producing a heated exhaust stream therefrom, may include producing a mixed gas stream containing hydrogen gas, as a majority component, and other gases, in a heated hydrogen-producing region of a fuel processing system. At least a portion of the mixed gas stream may then be delivered to a PSA assembly, followed by separating the mixed gas stream delivered to the PSA assembly into streams forming a product stream containing a greater concentration of hydrogen gas than the mixed gas stream and a byproduct stream containing a substantial portion of the other gases, and cycling the PSA assembly through at least one reduced byproduct period during which the combustion fuel value of the byproduct stream from the pressure swing adsorption assembly is lower than a predetermined, corresponding threshold value. The method may then include selectively supplying the byproduct stream to the heating assembly, such as during periods in which the byproduct stream has a fuel value at least as great as the predetermined threshold value, and/or selectively supplying an auxiliary fuel stream to the heating assembly during the at least one reduced byproduct period. The method may then include combusting the one or more streams supplied to the heating assembly, and heating at least the hydrogen-producing region with the heated exhaust stream to maintain the hydrogen-producing region within a predetermined hydrogen-producing temperature range.

As discussed above, in such a method, separating the mixed gas stream delivered to the PSA assembly may include adsorbing the other gases from the mixed gas stream to produce the product stream, and depressurizing and purging the adsorbent bed to desorb the other gases therefrom and thereby produce the byproduct stream. The reduced byproduct period may include an equalization step of the PSA assembly during which there is no flow of byproduct stream from the PSA assembly to the heating assembly. Instead, the byproduct stream is redirected within the PSA assembly.

Also, in such a method, an auxiliary fuel stream supplied to the heating assembly during the at least one reduced byproduct period may include one or more combustible fuel streams discussed above, which may be regulated in some embodiments to use only an amount of an auxiliary stream sufficient, when combined with the byproduct stream, that the resulting supplied streams have a combined combustion fuel value at least as great as the corresponding, predetermined threshold value. The regulation may be based, at least in part, on the expected or actual fuel value of the byproduct stream, and may be performed, for example, by one or more controllers 200 via any suitable combination of flow-regulating devices 170. This regulation may additionally or alternatively be based, at least in part, on the current, or next sequential, stage of the PSA cycle.

In some methods that include supplying a byproduct stream to the heating assembly and supplying an auxiliary fuel stream to the heating assembly, such as methods that include alternating between supplying a byproduct stream and an auxiliary stream, the former may at least partially overlap in time with the latter, such as to ensure that a continuous flow of combustible fuel having a combined fuel value at least as great as the predetermined threshold fuel value is supplied to the heating assembly.

In embodiments in which a byproduct stream is discharged only intermittently from a PSA assembly, an illustrative and non-exclusive example of a method of intermittently supplying an auxiliary fuel stream having at least a threshold combustion fuel value to a heating assembly adapted to receive such a fuel stream and to produce a heated exhaust stream therefrom, may include producing a mixed gas stream containing hydrogen gas, as a majority component, and other gases, in a heated hydrogen-producing region of a fuel processing system, and delivering at least a portion of the mixed gas stream to the PSA assembly. The method may then include separating the mixed gas stream delivered to the PSA assembly into a product stream containing a greater concentration of hydrogen gas than the mixed gas stream and a byproduct stream containing a substantial portion of the other gases, and intermittently discharging from the PSA assembly the byproduct stream and delivering at least a portion of the byproduct stream discharged from the PSA assembly to the heating assembly. When a byproduct stream is not discharged from the PSA assembly, the method may include one or more of redirecting to the heating assembly a portion of the mixed gas stream that is not delivered to the pressure swing adsorption assembly, and selectively storing at least a portion of the byproduct stream discharged from the pressure swing adsorption assembly and directing to the heating assembly a portion of the stored byproduct stream. The method may then include combusting the one or more streams supplied to the heating assembly, and heating at least the hydrogen-producing region with the heated exhaust stream to maintain the hydrogen-producing region within a predetermined hydrogen-producing temperature range.

Illustrative, non-exclusive examples of implementations of the systems and methods for providing one or more fuel streams having a combined fuel value at least as great as a predetermined threshold fuel value that is sufficient, when combusted to produce a heated exhaust stream, to maintain a hydrogen-producing region within a desired hydrogen-producing temperature range include, but are not limited to, one or more of the following implementations:

Supplying one or more fuel streams having at least a combined threshold combustion fuel value to a heating assembly adapted to receive and combust such a combustion stream, and for producing a heated exhaust stream therefrom;

Intermittently supplying an auxiliary fuel stream having at least a threshold combustion fuel value to a heating assembly adapted to receive such a fuel stream to produce a heated exhaust stream therefrom;

Producing a mixed gas stream containing hydrogen gas, as a majority component, and other gases, in a heated hydrogen-producing region of a fuel processing system;

Delivering at least a portion of a mixed gas stream to a pressure swing adsorption assembly;

Separating a mixed gas stream delivered to a PSA assembly into streams forming a product stream containing a greater concentration of hydrogen gas than the mixed gas stream and a byproduct stream containing a substantial portion of the other gases;

Adsorbing other gases from a mixed gas stream to produce a product stream and depressurizing and purging an adsorbent bed to desorb the other gases therefrom and thereby produce a byproduct stream;

Cycling through at least one reduced byproduct period during which the combustion fuel value of a byproduct stream from a PSA assembly is lower than a predetermined, corresponding threshold value;

Cycling through at least one equalization step during which there is no flow of a byproduct stream from a PSA assembly to a heating assembly;

Redirecting a byproduct stream within a PSA assembly during an equalization step;

Intermittently discharging from a PSA assembly a byproduct stream and delivering at least a portion of the byproduct stream discharged from the PSA assembly to a heating assembly;

Selectively supplying a byproduct stream to a heating assembly, and selectively supplying an auxiliary fuel stream to the heating assembly during at least a reduced byproduct period;

Supplying a portion of a mixed gas stream that is not delivered to the PSA assembly as an auxiliary fuel stream;

Supplying only the portion of a mixed gas stream that is not delivered to the PSA assembly as an auxiliary fuel stream;

Selectively storing at least a portion of a byproduct stream from a PSA assembly for reuse, and supplying at least a portion of the stored byproduct stream as an auxiliary fuel stream;

Selectively storing at least a portion of a product stream from a PSA assembly for reuse, and supplying at least a portion of the stored product stream as an auxiliary fuel stream;

Regulating an auxiliary fuel stream supplied to a heating assembly by using an amount of a, auxiliary fuel stream that is sufficient, when combined with a byproduct stream, that the resulting supplied streams have a combined combustion fuel value at least as great as the corresponding, predetermined threshold value;

Monitoring the combustion fuel value of a byproduct stream;

Regulating the auxiliary fuel stream supplied to the heating assembly based at least in part on the combustion fuel value of a byproduct stream;

Supplying a byproduct stream to a heating assembly at least partially overlapping in time with selectively supplying an auxiliary fuel stream to the heating assembly;

Supplying an auxiliary fuel stream to a heating assembly when a byproduct stream is not discharged from a PSA assembly, by one or more of redirecting to a heating assembly a portion of a mixed gas stream that is not delivered to the PSA assembly, and selectively storing at least a portion of the byproduct stream discharged from the PSA assembly and directing to the heating assembly a portion of the stored byproduct stream;

Combusting one or more streams supplied to a heating assembly;

Heating at least a hydrogen-producing region with a heated exhaust stream to maintain the hydrogen-producing region within a predetermined hydrogen-producing temperature range;

Any of the above systems or methods implemented with a PSA assembly having a plurality of adsorbent beds adapted to receive a mixed gas stream that includes hydrogen gas as its majority component and which is produced by a fuel processing system that includes at least one reforming region adapted to produce the mixed gas stream by steam reforming water and a carbon-containing feedstock, with at least the reforming region(s) of the fuel processing system adapted to be heated by a heating assembly, with the PSA assembly adapted to provide at least one fuel stream to the heating assembly, and optionally in further combination with a fuel cell stack adapted to receive at least a portion of the purified hydrogen gas produced by the PSA assembly;

Methods for implementing the processes of any of the above systems and/or use of any of the above systems; and/or A control system adapted to control the operation of a PSA assembly and/or an associated hydrogen-generation assembly to implement any of the above methods or control systems.

These implementations may be implemented in one or more of a PSA assembly; a PSA assembly adapted to purify hydrogen gas; a fuel processing system having a hydrogen-producing region adapted to receive a feed stream and to produce a mixed gas stream containing hydrogen gas and other gases therefrom, wherein hydrogen gas forms a majority component of the mixed gas stream; a heating assembly adapted to receive and combust one or more streams having a combined combustion fuel value at least as great as a corresponding, predetermined threshold and thereby produce a heated exhaust stream sufficient to heat and maintain at least a hydrogen-producing region within a predetermined temperature range for producing a mixed gas stream; a PSA assembly adapted to separate at least a portion of a mixed gas stream into streams forming a product stream and a byproduct stream, the product stream containing at least substantially pure hydrogen gas and having a reduced concentration of the other gases than the mixed gas stream, and the byproduct stream containing at least a substantial portion of the other gases; a PSA assembly adapted to intermittently discharge a byproduct stream having at least a predetermined threshold fuel value; a PSA assembly with a plurality of adsorbent beds, each bed including an adsorbent region containing adsorbent adapted to adsorb at least one of the other gases; a PSA assembly adapted to cycle through an equalization step in which at least two adsorbent beds are fluidly interconnected for gas flow between the beds; a PSA assembly adapted such that a byproduct stream having at least a predetermined threshold fuel value is not discharged from the PSA assembly during an equalization step; a combustion fuel stream supply system adapted to selectively supply a byproduct stream to a heating assembly and to also selectively supply, when a byproduct stream having at least a predetermined threshold fuel value is not discharged from a PSA assembly, an auxiliary fuel stream to the heating assembly, such that the one or more streams supplied to the heating assembly have a combined combustion fuel value at least as great as the corresponding, predetermined threshold value; a reservoir assembly adapted to receive and store at least a portion of a byproduct stream having at least a predetermined threshold fuel value discharged from a PSA assembly; a combustion fuel stream supply system adapted to selectively direct at least a portion of a byproduct stream having at least a predetermined threshold fuel value discharged from a PSA assembly to a reservoir assembly and to selectively use at least a portion of the stored byproduct stream when supplying an auxiliary fuel stream; a combustion fuel stream supply system adapted to selectively redirect at least a portion of a mixed gas stream produced by a fuel processing system prior to delivery to a PSA assembly, and to use at least a portion of the redirected mixed gas stream when supplying an auxiliary fuel stream; a combustion fuel stream supply system adapted to selectively redirect at least a portion of a mixed gas stream produced by a fuel processing system prior to delivery to a PSA assembly, and to use at least a portion of the redirected mixed gas stream when supplying an auxiliary fuel stream; and a combustion fuel stream supply system adapted to monitor the combustion fuel value of one or more of a byproduct stream, a mixed gas stream delivered to a PSA assembly, and an auxiliary stream.

Although discussed herein in the context of a PSA assembly for purifying hydrogen gas, it is within the scope of the present disclosure that the PSA assemblies disclosed herein, as well as the methods of operating the same, may be used in other applications, such as to purify other mixed gas streams in fuel cell or other systems and/or to heat structure other than a hydrogen-producing region of a fuel processing system.

INDUSTRIAL APPLICABILITY

The pressure swing adsorption assemblies, combustion fuel stream supply systems, and hydrogen-generation and/or fuel cell systems including the same are applicable in the gas generation and fuel cell fields, including such fields in which hydrogen gas is generated, purified, and/or consumed to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method for supplying one or more fuel streams having at least a combined threshold combustion fuel value to a heating assembly adapted to receive and combust such a combustion stream, and for producing a heated exhaust stream therefrom, the method comprising:
    supplying a feed stream to a heated hydrogen-producing region of a fuel processing system;
    producing a mixed gas stream containing hydrogen gas, as a majority component, and other gases, in the heated hydrogen-producing region of the fuel processing system;
    delivering at least a portion of the mixed gas stream to a pressure swing adsorption assembly containing at least an adsorbent bed;
    separating the mixed gas stream delivered to the pressure swing adsorption assembly into streams forming a product stream containing a greater concentration of hydrogen gas than the mixed gas stream and a byproduct stream containing a substantial portion of the other gases, wherein the separating includes cycling through at least one reduced byproduct period during which the combustion fuel value of the byproduct stream from the pressure swing adsorption assembly is lower than a corresponding, predetermined threshold value, wherein the cycling is performed as part of the separating;
    selectively supplying the byproduct stream to the heating assembly as a fuel stream;
    selectively supplying an auxiliary fuel stream to the heating assembly during the at least one reduced byproduct period;
    combusting the one or more fuel streams supplied to the heating assembly; and
    heating at least the hydrogen-producing region with the heated exhaust stream to maintain the hydrogen-producing region within a predetermined hydrogen-producing temperature range.

2. The method of claim 1, wherein the separating includes adsorbing the other gases from the mixed gas stream to produce the product stream and depressurizing and purging the adsorbent bed to desorb the other gases therefrom and thereby produce the byproduct stream.

3. The method of claim 1, wherein the at least one reduced byproduct period includes an equalization step during which there is no flow of byproduct stream from the pressure swing adsorption assembly to the heating assembly.

4. The method of claim 3, wherein the byproduct stream is redirected within the pressure swing adsorption assembly during the equalization step.

5. The method of claim 1, wherein the selectively supplying an auxiliary fuel stream includes supplying a portion of the mixed gas stream that is not delivered to the pressure swing adsorption assembly.

6. The method of claim 5, wherein the selectively supplying an auxiliary fuel stream includes supplying only the portion of the mixed gas stream that is not delivered to the pressure swing adsorption assembly.

7. The method of claim 5, further comprising selectively storing at least a portion of the byproduct stream from the pressure swing adsorption assembly for reuse, and wherein the selectively supplying an auxiliary fuel stream further includes supplying at least a portion of the stored byproduct stream.

8. The method of claim 1, further comprising selectively storing at least a portion of the byproduct stream from the pressure swing adsorption assembly for reuse, and wherein the selectively supplying an auxiliary fuel stream includes at least a portion of the stored byproduct stream.

9. The method of claim 8, wherein the selectively supplying an auxiliary fuel stream includes supplying only the stored byproduct stream.

10. The method of claim 8, wherein the selectively supplying an auxiliary fuel stream further includes supplying at least a portion of the mixed gas stream that is not delivered to the pressure swing adsorption assembly.

11. The method of claim 1, wherein the selectively supplying an auxiliary fuel stream further includes regulating the auxiliary fuel stream supplied by using an amount of the auxiliary fuel stream sufficient, when combined with the byproduct stream, that the resulting supplied streams have a combined combustion fuel value at least as great as the corresponding, predetermined threshold value.

12. The method of claim 11, further including monitoring the combustion fuel value of the byproduct stream, and wherein regulating the auxiliary fuel stream supplied is based at least in part on the combustion fuel value of the byproduct stream.

13. The method of claim 1, wherein the selectively supplying the byproduct stream to the heating assembly at least partially overlaps in time with selectively supplying an auxiliary fuel stream to the heating assembly.

14. The method of claim 1, further comprising selectively storing at least a portion of the product stream from the pressure swing adsorption assembly for reuse, and wherein the selectively supplying an auxiliary fuel stream includes at least a portion of the stored product stream.

15. The method of claim 1, wherein the reduced byproduct period includes an equalization step of a pressure swing adsorption cycle of the pressure swing adsorption assembly, and further wherein, during the equalization step, the method further includes redirecting at least a portion of the byproduct stream within the pressure swing adsorption assembly.

16. The method of claim 15, wherein the redirecting includes ceasing a flow of the byproduct stream from the pressure swing adsorption assembly.

17. The method of claim 1, wherein the cycling includes periodically cycling through the reduced byproduct period, wherein the periodically cycling includes intermittently discharging the byproduct stream from the pressure swing adsorption assembly.

18. The method of claim 1, wherein the cycling is not associated with a start-up operation of the pressure swing adsorption assembly.

19. The method of claim 1, wherein the cycling includes cycling through a plurality of reduced byproduct periods as part of a pressure swing adsorption cycle.

20. A method for intermittently supplying an auxiliary fuel stream having at least a threshold combustion fuel value to a heating assembly adapted to receive such a fuel stream to produce a heated exhaust stream therefrom, the method comprising:
   supplying a mixed gas stream to a heated hydrogen-producing region of a fuel processing system;
      producing a mixed gas stream containing hydrogen gas, as a majority component, and other gases, in the heated hydrogen-producing region of the fuel processing system;
      delivering at least a portion of the mixed gas stream to a pressure swing adsorption assembly;
      separating the mixed gas stream delivered to the pressure swing adsorption assembly into a product stream containing a greater concentration of hydrogen gas than the mixed gas stream and a byproduct stream containing a substantial portion of the other gases, wherein the separating includes intermittently discharging from the pressure swing adsorption assembly the byproduct stream and delivering at least a portion of the byproduct stream discharged from the pressure swing adsorption assembly to the heating assembly, wherein the intermittently discharging is performed as part of the separating;
   supplying an auxiliary fuel stream to the heating assembly when the byproduct stream is not discharged, by one or more of:
   redirecting to the heating assembly a portion of the mixed gas stream that is not delivered to the pressure swing adsorption assembly; and
   selectively storing at least a portion of the byproduct stream discharged from the pressure swing adsorption assembly and directing to the heating assembly a portion of the stored byproduct stream;
   generating the heated exhaust stream by combusting at least portions of any of the byproduct stream and the auxiliary fuel stream delivered to the heating assembly; and
   heating at least the hydrogen-producing region with the heated exhaust stream to maintain the hydrogen-producing region within a predetermined hydrogen-producing temperature range.

21. The method of claim 20, wherein the intermittently discharging includes equalizing pressure within at least a portion of the pressure swing adsorption assembly, and further wherein, during the equalizing, the method further includes redirecting at least a portion of the byproduct stream within the pressure swing adsorption assembly.

22. The method of claim 21, wherein the redirecting includes ceasing a flow of the byproduct stream from the pressure swing adsorption assembly.

23. The method of claim 20, wherein the intermittently discharging includes periodically cycling through the reduced byproduct period as part of a pressure swing adsorption cycle.

24. The method of claim 20, wherein the intermittently discharging is not associated with a start-up operation of the pressure swing adsorption assembly.

* * * * *

UNITED STATES PATENT AND TRADEMARK OFFICE
CERTIFICATE OF CORRECTION

PATENT NO.        : 8,070,841 B2
APPLICATION NO.   : 12/001838
DATED             : December 6, 2011
INVENTOR(S)       : Patton M. Adams, Travis A. Bizjak and James A. Givens Page 1 of 1

It is certified that error appears in the above-identified patent and that said Letters Patent is hereby corrected as shown below:

Column 29, Line 28, Claim 20, after "supplying a" please delete "mixed gas" and insert -- feed --.

Column 30, Line 35, Claim 23, after "periodically cycling through" please delete "the" and insert -- a --.

Signed and Sealed this
Third Day of July, 2012

David J. Kappos
*Director of the United States Patent and Trademark Office*